(12) United States Patent
Cremer et al.

(10) Patent No.: US 12,443,642 B2
(45) Date of Patent: Oct. 14, 2025

(54) RESPONDING TO REMOTE MEDIA CLASSIFICATION QUERIES USING CLASSIFIER MODELS AND CONTEXT PARAMETERS

(71) Applicant: Gracenote, Inc., Emeryville, CA (US)

(72) Inventors: Markus K. Cremer, Orinda, CA (US); Jason Cramer, Berkeley, CA (US); Phillip Popp, Oakland, CA (US); Cameron Aubrey Summers, Oakland, CA (US)

(73) Assignee: GRACENOTE, INC., New York, NY (US)

( * ) Notice: Subject to any disclaimer, the term of this patent is extended or adjusted under 35 U.S.C. 154(b) by 105 days.

(21) Appl. No.: 17/157,796

(22) Filed: Jan. 25, 2021

(65) Prior Publication Data

US 2021/0149939 A1 May 20, 2021

Related U.S. Application Data

(63) Continuation of application No. 15/185,616, filed on Jun. 17, 2016, now Pat. No. 10,902,043.
(Continued)

(51) Int. Cl.
*G06F 16/13* (2019.01)
*G06F 3/00* (2006.01)
(Continued)

(52) U.S. Cl.
CPC ............. *G06F 16/35* (2019.01); *G06F 16/41* (2019.01); *G06F 16/61* (2019.01); *G06N 3/04* (2013.01); *G06N 3/045* (2023.01)

(58) Field of Classification Search
CPC .......... G06F 16/35; G06F 16/61; G06F 16/41; G06N 3/04; G06N 3/0454
See application file for complete search history.

(56) References Cited

U.S. PATENT DOCUMENTS 5,285,498 A   2/1994   Johnston
5,473,631 A   12/1995  Moses
(Continued)

FOREIGN PATENT DOCUMENTS

EP   1542206 A1   6/2005
EP   2339575 A1   6/2011
(Continued)

OTHER PUBLICATIONS

International Searching Authority, "International Preliminary Report on Patentability" issued in connection with International Patent Application No. PCT/US2016/068898, dated Jul. 12, 2018, 14 pages.
(Continued)

*Primary Examiner* — Brandon S Cole
(74) *Attorney, Agent, or Firm* — MCDONNELL BOEHNEN HULBERT & BERGHOFF LLP

(57) ABSTRACT

A neural network-based classifier system can receive a query including a media signal and, in response, provide an indication that a particular received query corresponds to a known media type or media class. The neural network-based classifier system can select and apply various models to facilitate media classification. In an example embodiment, classifying a media query includes accessing digital media data and a context parameter from a first device. A model for use with the network-based classifier system can be selected based on the context parameter. In an example embodiment, the network-based classifier system provides a media type probability index for the digital media data using the selected model and spectral features corresponding to the digital media data. In an example embodiment, the digital media data includes an audio or video signal sample.

20 Claims, 13 Drawing Sheets

Related U.S. Application Data

(60) Provisional application No. 62/274,362, filed on Jan. 3, 2016.

(51) Int. Cl.

| | | |
|---|---|---|
| *G06F 16/35* | (2019.01) | |
| *G06F 16/41* | (2019.01) | |
| *G06F 16/61* | (2019.01) | |
| *G06F 16/93* | (2019.01) | |
| *G06F 16/95* | (2019.01) | |
| *G06N 3/04* | (2023.01) | |
| *G06N 3/045* | (2023.01) | |

(56) References Cited

U.S. PATENT DOCUMENTS

| | | | |
|---|---|---|---|
| 5,825,976 A | 10/1998 | Dorward et al. | |
| 8,005,675 B2 | 8/2011 | Wasserblat et al. | |
| 8,364,467 B1 | 1/2013 | Bowman et al. | |
| 8,407,224 B2 | 3/2013 | Bach et al. | |
| 8,892,231 B2 | 11/2014 | Cheng et al. | |
| 8,897,566 B2* | 11/2014 | Iwamoto | H04N 19/124 |
| | | | 382/190 |
| 8,930,199 B2 | 1/2015 | Oh et al. | |
| 9,008,438 B2 | 4/2015 | Kawanishi et al. | |
| 9,098,576 B1 | 8/2015 | Sharifi et al. | |
| 9,111,531 B2 | 8/2015 | Atti et al. | |
| 9,123,350 B2 | 9/2015 | Zhao | |
| 9,305,559 B2 | 4/2016 | Sharma et al. | |
| 9,443,517 B1 | 9/2016 | Foerster et al. | |
| 9,465,994 B1 | 10/2016 | Mishra | |
| 10,902,043 B2 | 1/2021 | Cremer et al. | |
| 10,979,755 B2* | 4/2021 | Reibman | H04N 21/233 |
| 2003/0108030 A1* | 6/2003 | Gao | H04L 45/306 |
| | | | 370/351 |
| 2003/0161396 A1 | 8/2003 | Foote et al. | |
| 2004/0138882 A1 | 7/2004 | Miyazawa | |
| 2004/0260547 A1 | 12/2004 | Cohen et al. | |
| 2006/0020958 A1 | 1/2006 | Allamanche et al. | |
| 2006/0200253 A1 | 9/2006 | Hoffberg et al. | |
| 2007/0083365 A1 | 4/2007 | Shmunk | |
| 2008/0243512 A1 | 10/2008 | Breebaart et al. | |
| 2008/0300702 A1 | 12/2008 | Gomez et al. | |
| 2010/0004926 A1 | 1/2010 | Neoran et al. | |
| 2011/0075851 A1 | 3/2011 | LeBoeuf et al. | |
| 2011/0093259 A1* | 4/2011 | Saffer | G10L 15/06 |
| | | | 704/E11.001 |
| 2011/0161076 A1 | 6/2011 | Davis et al. | |
| 2011/0282663 A1 | 11/2011 | Talwar et al. | |
| 2012/0022863 A1 | 1/2012 | Cho et al. | |
| 2012/0069767 A1 | 3/2012 | Minde | |
| 2012/0078397 A1 | 3/2012 | Lee et al. | |
| 2012/0117339 A1* | 5/2012 | Kandekar | G06F 16/13 |
| | | | 711/159 |
| 2012/0197642 A1 | 8/2012 | Liu et al. | |
| 2013/0103398 A1 | 4/2013 | Rauhala | |
| 2013/0142401 A1 | 6/2013 | Nomoto et al. | |
| 2013/0150117 A1 | 6/2013 | Rodriguez et al. | |
| 2013/0185063 A1 | 7/2013 | Atti et al. | |
| 2013/0226850 A1 | 8/2013 | Hannuksela et al. | |
| 2014/0019390 A1 | 1/2014 | Glennon et al. | |
| 2014/0039888 A1* | 2/2014 | Taubman | G10L 15/30 |
| | | | 704/235 |
| 2014/0046659 A1 | 2/2014 | Burton et al. | |
| 2014/0201126 A1 | 7/2014 | Zadeh et al. | |
| 2014/0245463 A1 | 8/2014 | Suryanarayanan et al. | |
| 2014/0279786 A1* | 9/2014 | Grokop | G06F 1/3234 |
| | | | 706/46 |
| 2015/0071556 A1 | 3/2015 | Simske et al. | |
| 2015/0332667 A1 | 11/2015 | Mason | |
| 2015/0340024 A1* | 11/2015 | Schogol | G10L 15/26 |
| | | | 704/235 |
| 2015/0348541 A1* | 12/2015 | Epstein | G10L 15/183 |
| | | | 704/257 |
| 2016/0155456 A1 | 6/2016 | Wang | |
| 2016/0247175 A1 | 8/2016 | Milton et al. | |
| 2016/0284349 A1* | 9/2016 | Ravindran | G10L 15/285 |
| 2016/0300565 A1 | 10/2016 | Arrowood et al. | |
| 2017/0017576 A1* | 1/2017 | Cammarota | G06F 12/0893 |
| 2017/0032247 A1 | 2/2017 | Tadesse et al. | |
| 2017/0091654 A1 | 3/2017 | Singh et al. | |
| 2017/0109818 A1* | 4/2017 | Amtrup | G06V 30/40 |
| 2017/0193097 A1 | 7/2017 | Cramer et al. | |
| 2018/0204111 A1 | 7/2018 | Zadeh et al. | |
| 2021/0149939 A1 | 5/2021 | Cremer et al. | |

FOREIGN PATENT DOCUMENTS

| | | |
|---|---|---|
| JP | 2007058532 A | 3/2007 |
| JP | 2008227579 A | 9/2008 |
| JP | 2008243104 A | 10/2008 |
| JP | 2015507222 A | 3/2015 |
| KR | 20070117660 A | 12/2007 |
| KR | 20130118112 A | 10/2013 |
| KR | 101498347 B1 | 3/2015 |
| KR | 10-2015-0083580 A | 7/2015 |
| WO | 9930415 | 6/1999 |
| WO | 2006099082 A2 | 9/2006 |
| WO | 2006132596 A1 | 12/2006 |
| WO | 2012147256 A1 | 11/2012 |
| WO | 2013106192 A1 | 7/2013 |
| WO | 2015030796 A1 | 3/2015 |

OTHER PUBLICATIONS

International Searching Authority, "Invitation to Pay Additional Fees and, Where Applicable, Protest Fee," in connection with International Application No. PCT/US2016/68898, dated Mar. 2, 2017, 3 pages.

Carey et al. "A comparison of features for speech, music discrimination." 1999 IEEE International Conference on Acoustics, Speech, and Signal Processing Proceedings, IEEE, 1999, 4 pages.

Chen et al. "Mixed Type Audio Classification with Support Vector Machine," 2006 IEEE International Conference on Multimedia and Expo, IEEE, Jul. 9-12, 2006, 4 pages.

Chu et al. "A Noise-Robust FFT-Based Auditory Spectrum With Application in Audio Classification." IEEE Transactions on Audio, Speech, and Language Processing, vol. 16, No. 1, Jan. 2008, 14 pages.

Kim et al. "Audio Classification Based on MPEG-7 Spectral Basis Representations." IEEE Transactions on Circuits and Systems for Video Technology, vol. 14, No. 5, May 2004, 10 pages.

Lin et al. "Audio Classification and Categorization Based on Wavelets and Support Vector Machine." IEEE Transactions on Speech and Audio Processing, vol. 13, No. 5, Jan. 18, 2005, 8 pages.

Iu et al. "Classification of Music and Speech in Mandarin News Broadcasts," Man-Machine Speech Communication (NCMMSC), Jan. 2007, 7 pages.

Mckinney et al. "Features for Audio and Music Classification," Philips Research Laboratories, Nov. 2003, 8 pages.

Kie et al. "Pitch-density-based features and an SVM binary tree approach for multi-class audio classification in broadcast news." Multimedia Systems, vol. 17, Mar. 2011, 13 pages.

Grosse et al. "Shift-Invariance Sparse Coding for Audio Classification." arXiv preprint arXiv:1206.5241, 2012, 10 pages.

Johnston, "Transform Coding of Audio Signals Using Perceptual Noise Criteria." IEEE Journal on Selected Areas in Communications, vol. 6, No. 2, Feb. 1988, 10 pages.

International Searching Authority, "International Search Report and Written Opinion," in connection with International Application No. PCT/US2016/68898, dated May 3, 2017, 22 pages.

European Patent Office, "Extended European Search Report", issued in connection with application No. 16882570.1, dated May 8, 2019, 8 pages.

Japanese Patent Office, "Search Report", issued in connection with Japanese Patent Application No. 2018-534631 dated Jul. 11, 2019, 19 pages.

(56) References Cited

OTHER PUBLICATIONS

Korean Intellectual Property Office, "Notice of Preliminary Rejection", issued in connection with application No. 10-2018-7022348 dated Aug. 8, 2019, 68 pages.
Ogleja et al., "A Virtual Cloud Computing Provider for Mobile Devices," 1st ACM Workshop on Mobile Cloud Computing & Services, Vrije Universiteit Amsterdam, Mar. 21, 2012, 24 pages.
Kosta et al., "ThinkAir: Dynamic resource allocation and parallel execution in the cloud for mobile code offloading," 2012 Proceedings IEEE INFOCOM, Mar. 25-30, 2012, pp. 945-953, 9 p.
Ku et al., "An artificial neural network approach for predicting architectural speech security (L)," The Journal of the Acoustical Society of America vol. 117, No. 4, Pt. 1, Apr. 2005, pp. 1709-1712, 5 pages, 10.1121/1.1862092.
European Patent Office, "Communication pursuant to Rules 70(2) and 70a(2) EPC," issued in connection with European Patent Application No. 16882570.1, dated May 24, 2019, 1 page.
Japanese Patent Office, "Decision to Grant a Patent", issued in connection with Japanese Patent Application No. 2018-534631 dated Jun. 2, 2020, 5 pages.
United States Patent and Trademark Office, "Notice of Allowance and Fee(s) Due" issued in connection with U.S. Appl. No. 15/185,654 dated Jun. 14, 2019, 9 pages.
United States Patent and Trademark Office, "Non-Final Office Action," issued in connection with U.S. Appl. No. 15/185,654 dated Jan. 28, 2019, 27 pages.
United States Patent and Trademark Office, "Notice of Allowance and Fee(s) Due," issued in connection with U.S. Appl. No. 15/185,654 dated Oct. 31, 2019, 9 pages.
Japanese Patent Office, "Notice of Reasons for Refusal", issued in connection with Japanese Patent Application No. 2018-534631 dated Sep. 3, 2019, 10 pages.
United States Patent and Trademark Office, "Supplemental Notice of Allowability," issued in connection with U.S. Appl. No. 15/185,654 dated Nov. 15, 2019, 6 pages.
Korean Patent Office, "Notice of Final Rejection", issued in connection with Korean Patent Application No. 10-2018-7022348 dated Feb. 28, 2020, 8 pages.
Korean Intellectual Property Office, "Notice of Allowance", issued in connection with application No. 10-2018-7022348 dated Apr. 6, 2020, 5 pages.
European Patent Office, "Communication pursuant to Article 94(3) EPC", issued in connection with European Patent Application No. 16 882 570.1, dated Apr. 2, 2020, 5 pages.
United States Patent and Trademark Office, "Non-Final Office Action," issued in connection with U.S. Appl. No. 15/185,616 dated Jan. 9, 2019, 40 pages.
United States Patent and Trademark Office, "Final Office Action," issued in connection with U.S. Appl. No. 15/185,616 dated Jul. 8, 2019, 28 pages.
United States Patent and Trademark Office, "Non-Final Office Action," issued in connection with U.S. Appl. No. 15/185,616 dated May 5, 2020, 31 pages.
United States Patent and Trademark Office, "Notice of Allowance and Fee(s) Due," issued in connection with U.S. Appl. No. 15/185,616 dated Sep. 22, 2020, 6 pages.
Japanese Patent Office, "Decision to Grant a Patent", issued in connection with Japanese Patent Application No. 2020-114761 dated Jun. 15, 2021, 5 pages.
European Patent Office, "Communication under Rule 71(3) EPC," issued in connection with European Patent Application No. 16 882 570.1, dated Jan. 31, 2022, 71 pages.
Korean Intellectual Property Office, "Notice of Preliminary Rejection", issued in connection with application No. 10-2020-7019482 dated Feb. 9, 2022, 5 pages.
European Patent Office, "Summons to attend oral proceedings pursuant to Rule 115(1) EPC," issued in connection with European Patent Application No. 16 882 570.1, dated Jul. 20, 2021, 8 pages.
Korean Intellectual Property Office, "Written Decision on Registration," issued in connection with Korean Patent Application No. 10-2020-7019482, on Jul. 1, 2022, 4 pages including partial English translation.
European Patent Office, "Extended Search Report," issued in connection with European Patent Application No. 22158366.9-1213, on Mar. 30, 2022, 8 pages.

* cited by examiner

RESPONDING TO REMOTE MEDIA CLASSIFICATION QUERIES USING CLASSIFIER MODELS AND CONTEXT PARAMETERS

CLAIM OF PRIORITY

This patent arises from a continuation of U.S. patent application Ser. No. 15/185,616, (Now U.S. Pat. No. 10,902, 043) which was filed on Jun. 17, 2016. This patent claims the benefit of priority of U.S. Provisional Patent Application Ser. No. 62/274,362, which was filed on Jan. 3, 2016. U.S. patent application Ser. No. 15/185,616 and U.S. Provisional Patent Application Ser. No. 62/274,362 are hereby incorporated herein by reference in their entireties. Priority to U.S. patent application Ser. No. 15/185,616 and U.S. Provisional Patent Application Ser. No. 62/274,362 is hereby claimed.

BACKGROUND

Media content provided by entertainment, news, and other communications sources, is ubiquitous in today's modern society. Even through no effort of their own, individuals are subject to constant advertising in public spaces, or ambient audio or video entertainment in spaces like restaurants and waiting areas. In some cases, individuals receive their own media content from various sources, such as by tuning in to a particular radio or television broadcast, or by receiving media streamed via the interne from social media or other sources.

Portable or fixed electronic devices, such as including cellular telephones, televisions, or tablet computers, can directly or indirectly receive media content. For example, a television can receive streaming audio and/or video content via the Internet in response to a user request for media. In an example, a smart phone can be configured to receive information about ambient media using an on-board microphone or camera. In some examples, a smart phone can be directed by a user to identify a source or other characteristic of a sample of ambient media, such as by using an app to communicate with a third party that provides identification services.

BRIEF DESCRIPTION OF THE DRAWINGS

Some embodiments are illustrated by way of example and not limitation in the figures of the accompanying drawings.

DETAILED DESCRIPTION

In an example embodiment, a machine can be configured to interact with one or more users or user devices to identify audio or video content. One approach is to configure the machine to perform audio fingerprinting, or classification, based on an audio sample, for example, by comparing a query fingerprint of an audio signal sample against various reference audio sample fingerprints in a database in an attempt to identify a match. When a query is performed using large databases, such audio fingerprinting can be computationally expensive and time consuming. Various systems and techniques described herein can be used to reduce the cost and expense of performing classification services, such as by using classification models that are tuned for particular environments, media types, or other scenarios. In an example embodiment, context information about a media query can be used to help select a classification model from among multiple different available classification models. In an example embodiment, some classification models applied by a classifier system, such as a convolutional neural network-based media classifier, can yield media classification results more efficiently than other models.

Figure 1:
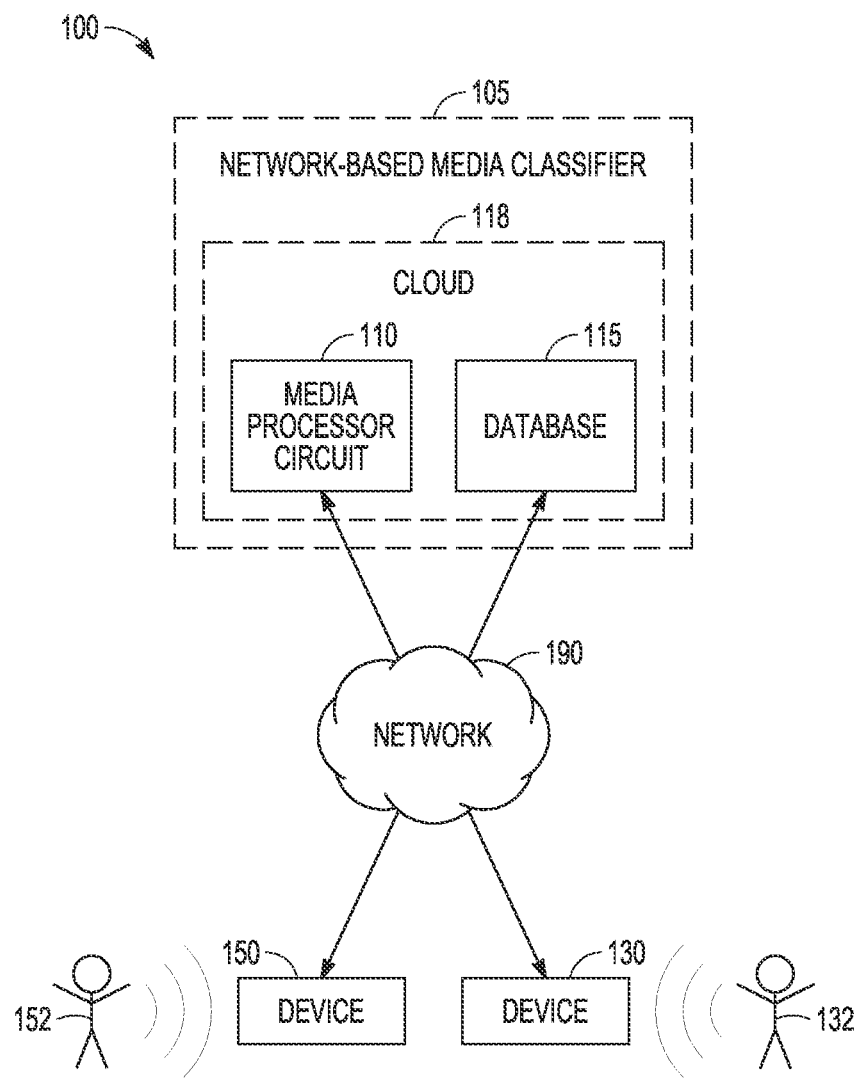
FIG. 1 illustrates generally an example embodiment of a system configured to receive and analyze media information.

FIG. 1 illustrates generally an example embodiment of a system configured to receive and analyze media information. FIG. 1 includes a network diagram illustrating a network environment 100 suitable for media classification, according to some example embodiments. The network environment 100 includes a media processor circuit 110, a database 115, and first and second mobile devices 130 and 150, such as can be communicatively coupled to each other via a network 190. The media processor circuit 110, with or without the database 115, can form part of a cloud 118 (e.g., an audio processing cloud, such as including multiple geographically distributed machines configured to function independently or collectively as a server to provide media processing services). The cloud 118 can form all or part of a system that includes a network-based media classifier 105, for example, as a cloud-based server system configured to provide network-based audio processing services to the first and second mobile devices 130 and 150. The media processor circuit 110 and the first and second mobile devices 130 and 150 can each be implemented in a special-purpose (e.g., specialized) computer system, in whole or in part, as further described herein.

In an example embodiment, the network environment 100 is configured to perform classification services on audio or video data. That is, in response to some input media, such as a sample of audio or video information from one of the first and second mobile devices 130 and 150, the various components of the cloud 118 can be used to provide an indication of a class or classification of the input media. A classification can include some characteristic associated with the media. In an example embodiment where input media includes an audio signal, a classification can include an indication of an author or artist, an album name, a source, a tempo, a mood, or other quantitative or qualitative feature corresponding to the audio signal. In an example embodiment, the input media is at least a portion of a song, and the network-based media classifier 105 can provide an indication of the song's title, artist, names of various recordings and/or albums associated with the song, or other information about or associated with the song.

In the example embodiment of FIG. 1, the network-based media classifier 105 and/or one of the first and second mobile devices 130 and 150 are configured to access input media queries from other sources, such as via an intranet or via the Internet. In an example embodiment, the network-based media classifier 105 receives unclassified media data from a transceiver or receiver that is configured to receive broadcast signals, such as television, radio, or other signals.

A processor circuit can be configured to analyze an input media query to access or identify a context parameter that corresponds to the query. The processor circuit can include the media processor circuit 110 at the cloud 118, or the processor circuit can be implemented at one of the first and second mobile devices 130 and 150. In an example embodiment, the processor circuit can be provided at another portion of the network-based media classifier 105, or at another location that is communicatively coupled with the network-based media classifier 105 and/or the first and second mobile devices 130 and 150. In an example embodiment, the processor circuit configured to identify a context parameter can be the same or different processor circuit than is used to perform audio classification services.

A context parameter can be additionally or alternatively accessed from somewhere other than an input media query. For example, a context parameter can include information about an input media query, such as sensory or environmental information that corresponds (e.g., temporally) with the query. In an example embodiment, a context parameter includes location information that corresponds to a location where a query was sampled (e.g., by the first mobile device 130). In an example embodiment, a context parameter includes device identification information or user identification information that corresponds to a device or user that acquires or prepares a query. Other context parameters can additionally or alternatively be used, as further discussed herein.

In an example embodiment, a processor circuit can be configured to determine spectral features of a media query. The spectral features can form all or a part of a fingerprint associated with the query. Based on or using a context parameter, the processor circuit can be configured to select a classification model for use in processing the spectral features to provide an indication of a media type that corresponds to the query. In an example embodiment, the processor circuit (e.g., the media processor circuit 110) determines a media type probability index for the query using the selected classification model and the determined spectral features. In an example embodiment, the probability index includes an indication of a likelihood that the media data corresponds to a particular known media, such as a particular song, artist, or album. In an example embodiment, if the probability index exceeds some specified threshold likelihood, then the processor circuit can return a media type indication without the probability index.

Returning to the example embodiment of FIG. 1, first and second users 132 and 152 are illustrated. One or both of the first and second users 132 and 152 can be a human user (e.g., a human being), a machine user (e.g., a computer configured by a software program to interact with the first or second mobile device 130 or 150), or any suitable combination thereof (e.g., a human assisted by a machine or a machine supervised by a human). The first user 132 is associated with the first mobile device 130 and can be a user of the first mobile device 130. For example, the first mobile device 130 can be a computer, a vehicle computer, a tablet computer, a navigational device, a portable media device, a smart phone, or a wearable device (e.g., a smart watch, smart glasses, smart clothing, or smart jewelry) belonging to or having user profile data associated with the first user 132. Likewise, the second user 152 is associated with the second mobile device 150 and can be a user of the second mobile device 150. In an example embodiment, each of the first and second users 132 and 152 and/or the first and second mobile devices 130 and 150 can be associated with various different classification models for use by the network-based media classifier 105.

In an example embodiment, one or both of the first and second mobile devices 130 and 150 can be configured to receive unclassified media using a microphone or other media sensor input. In an example embodiment, unclassified media can be sampled from a device's native source (e.g., a sound card or other native component of the first mobile device 130 or second mobile device 150) or from a device output terminal (e.g., a video out, a line out, a headphone jack, etc.) of the first or second mobile devices 130 or 150, or from some other device. The unclassified media can be sampled (e.g., by circuitry on-board the first or second mobile device 130 or 150) and communicated to the network-based media classifier 105 with a request for media identification services.

Any of the systems, machines, devices, or associated databases shown or described in connection with FIG. 1 can be, include, or can otherwise be implemented using a special-purpose (e.g., specialized or otherwise non-generic) computer that has been modified (e.g., configured or programmed by software, such as one or more software modules of an application, operating system, firmware, middleware, or other program) to perform one or more of the functions described herein for that system or machine. An example embodiment of a special-purpose computer system configured to implement any one or more of the methodologies described herein is discussed below at FIG. 12. Within the technical field of such special-purpose computers, a special-purpose computer that has been modified by the structures discussed herein to perform the functions discussed herein is technically improved compared to other special-purpose computers that lack the structures discussed herein or are otherwise unable to perform the functions discussed herein. Accordingly, a special-purpose machine configured according to the systems and methods discussed herein provides an improvement to the technology of similar special-purpose machines.

The database 115, which is further discussed below at least at FIG. 6, can include a data storage resource that can be configured to store data in various ways, for example in a text file, a table, a spreadsheet, a relational database (e.g., an object-relational database), a triple store, a hierarchical data store, or any suitable combination thereof. The network 190 can be any network that enables communication between or among systems, machines, databases, and devices (e.g., between the media processor circuit 110 and the first mobile device 130). The network 190 can be a wired network, a wireless network (e.g., a mobile or cellular network), or a combination thereof. The network 190 can include one or more portions that constitute a private network, a public network (e.g., the Internet), or a combination thereof.

The network 190 can include one or more portions that incorporate a local area network (LAN), a wide area network (WAN), the Internet, a mobile telephone network (e.g., a cellular network), a wired telephone network (e.g., a plain old telephone system (POTS) network), a wireless data network (e.g., a WiFi network or WiMax network), or a combination thereof. Any one or more portions of the network 190 can communicate information via a transmission medium. As used herein, "transmission medium" refers to any intangible (e.g., transitory) medium that is capable of communicating (e.g., transmitting) instructions for execution by a machine (e.g., by one or more processors of such a machine), and includes digital or analog communication signals or other intangible media to facilitate communication of such software.

Figure 2:
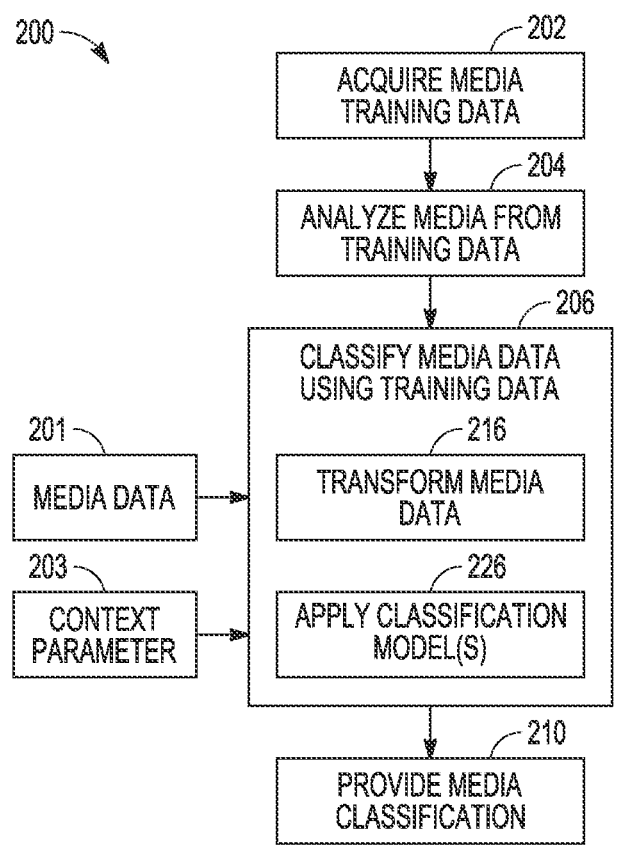
FIG. 2 illustrates generally a flow diagram of a method that can include providing a media classification.

FIG. 2 illustrates generally a flow diagram of a method that can include providing a media classification. The example embodiment in FIG. 2 illustrates generally a flow diagram of a method 200 for determining a media classification for media data 201, for example, using the network environment 100. The media data 201 can be a media query received from one of the first and second mobile devices 130 and 150, or from another source. The method 200 includes, at operation 202, acquiring media training data and, at operation 204, analyzing the acquired media training data. The method 200 further includes, at operation 206, classifying media data 201 (e.g., a media query that includes audio and/or video information) using various training data. At operation 210, the method 200 includes providing an indication of a media classification, or providing an indication of a likelihood that the media data 201 corresponds to some specified media.

In an example embodiment, the method 200 includes, at operation 206, using a context parameter 203. At operation 206, the media data 201 and the context parameter 203 can be used together to classify the media data using various training data.

In the method 200, features can be extracted from media data (e.g., training data or query data) using various digital signal processing (DSP) methods. For example, mel-frequency cepstral coefficients (MFCC), spectral flatness, mean value, zero crossings, spectral centroid, chord class, or percussiveness, among other extractable features, can be used. Various digital signal processing feature extraction methods and standards (e.g. MPEG-7) known in the art can be used. The extracted features can be used to perform comparative analyses of the media data, for example, using a trained classifier at step 206. In an example embodiment, training data is used to establish reference standards or models relative to identified criteria, and those models can then be used for evaluating the media data 201.

In the example embodiment of FIG. 2, a training set of media data acquired at step 202 includes one or more audio signal samples (e.g. a recording of a musical composition) and one or more editorially formed characteristics corresponding to each of the one or more audio signal samples. In an example embodiment, several characteristics can be considered together to be a media profile or fingerprint corresponding to the training set of media data. In an example embodiment, characteristics for the training data are defined automatically by associating media data with other existing media information (e.g., using the Compact Disc Database, CDDB, or other similar resource). In an example embodiment, characteristics for the training data are defined by one or more persons or aggregated from many persons who evaluate media for inclusion in the database 115. In an example embodiment, characteristics for the training data are generated using various analyses of aggregated end-user and/or editorially-generated tags or prose associated with the content, or other data mining methods can be applied to datasets whose origins can be independent of the training process.

At operation 204, analyzing media from the training data can include extracting various spectral features from the training set of media data. In an example embodiment, extracted features are evaluated against and correlated with the editorially assigned categories to create 'n' number of classification models, such as including at least one model for each of the 'n' categories. Accordingly, in this example, each classification model can be a correlation set of a category with extracted features typical of that category. Such classification models can be shared with a classifier (e.g., implemented by the media processor circuit 110) and applied at operation 206, where one or more classification models can serve as a basis for a comparison or reference standard for classifying the media data 201.

At operation 206, classifying the media data 201 using the training data can include extracting various spectral features from the query media data 201. The extracted features can then be compared with or processed using the classification models from 204. Classifying media at operation 206 can include, at operation 216, transforming the media data 201, or at operation 226, applying one or more classification models. In an example embodiment, classifying the media data 201 can include using a convolutional neural network trained on the previously analyzed training data. The convolutional neural network can be a processor-implemented classifier that uses media signal features from media data 201 that is sampled over one or more time windows (e.g., several milliseconds to several seconds). The classifier can be configured to detect whether a signal event or spectral feature is present in the media data 201 or not. The convolutional neural network generally contains thousands to millions of parameters that can be tuned for specific media events (e.g. whistles, dog barks, presence of music), and situations (e.g. specific recording device/microphone, environmental noises).

At operation 216, various functions can be applied to the media data 201. For example, a constant Q transform can be applied to convert a data series from the media data 201 to a frequency domain. Various spectral features can be identified in the media data 201 to discern different media types. Local contrast normalization can be performed, and then the resulting data can be applied to the convolutional neural network. When the media data 201 includes an audio signal, the local contrast normalization process can help make classifications invariant to overall volume changes in the audio signal and, to some degree, invariant to masking by extraneous sounds or loud sounds.

At operation 226, a classification model can be applied using the transformed media data as an input to the convolutional neural network. The convolutional neural network can analyze various features of the transformed media data 201 (e.g., over a time window of several seconds) to attempt to identify whether some specified feature or event is present or not. Such a convolutional neural network can include thousands to millions of parameters that can be tuned (e.g., weighted) for specific media events (e.g., whistling noises, dog barks, presence of music, etc.) or can be tuned for specific situations (e.g., media acquired by way of a mobile device, subject to environmental noise, etc.). Different classification models can be associated with unique combinations of tuned parameters.

In an example embodiment, applying a classification model at operation 226 includes detecting various events or characteristics in a query. For example, the media processor circuit 110 can be configured to populate, for a given query, a profile across 'n' categories including assigning a value for each feature or category based on similarities between the extracted features of the media data 201 and the features of 'n' classification models. In an example embodiment, applying a classification model at operation 226 includes detecting whether a query includes (or is likely to include) a specified event, such as an auditory event (e.g. whistle, dog-bark, presence of music, etc.). The classifier can optionally be used to classify discrete audio samples, or it can be used substantially continuously to classify a stream of received audio, for example, by processing a series of samples in sequence or at a specified interval.

In an example embodiment, a context parameter 203 can be used to trigger a classification process. Additionally or alternatively, a classification model can be selected for use based on the context parameter 203. In an example embodiment, the context parameter 203 can be derived from the media data 201 itself, such as by identifying changes in frequency content, amplitude, or in some other characteristic of the media data 201 signal. In an example embodiment, the context parameter 203 can be based on a signal from another source or sensor that is associated with the media data 201. For example, the context parameter 203 can be based on a signal from an accelerometer, a user input, a location sensor, a clock or timer circuit, or other context-providing indication that corresponds with the media data 201.

In an example embodiment, the media processor circuit 110 (or other processor circuit, such as associated with an input device to the network-based media classifier 105) can be configured to monitor the media data 201 for a specified event. The media data 201 can represent a media stream, such as an audio stream that is continuously or intermittently sampled. In this example, the media processor circuit 110 can be configured to operate in an "always on" mode where media classifications can be performed, e.g., at operation 206, at various intervals, or can be performed in response to some triggering event, such as a triggering event that exceeds a specified threshold change in the media data 201 or a specified threshold change in the context parameter 203.

In an example embodiment, the media processor circuit 110 (or other processor circuit, such as associated with an input device to the network-based media classifier 105) can be configured to scan a fixed audio segment or sample to identify one or more sample characteristics, such as to determine whether the sample includes music, speech, or some other media type. If a specified event is detected, then a media classification request can be initiated at operation 206. For example, the media processor circuit 110 can be configured to monitor an audio channel of a baby monitor. When the classifier identifies a change in the frequency content of a signal in the audio channel, the signal can be classified at operation 206 to determine whether it includes, or is likely to include, a baby's cry (e.g., as distinguished from other noises like talking or rustling). If a baby's cry is positively indicated, e.g., at operation 210, then a caregiver can be notified.

At operation 206, classifying the media data 201 can include providing a media type probability index for the media data 201. The media type probability index includes an indication or likelihood that the media data 201 corresponds to a specified media type. For example, the network-based media classifier 105 can be configured to receive the media data 201 or query and then transform the received query into a specified frequency or spectral space. The media processor circuit 110 can then apply a convolutional neural network to generate an indication of a probability or likelihood that the query corresponds to a particular media type. In an example embodiment, the result includes an indication of a relative likelihood that an audio sample corresponds to speech, music, or some combination thereof. Based on other results from the neural network, the results can indicate a likelihood that the audio sample corresponds to some specified audio characteristic or classification, such as a specified song. An output of the neural network can include an audio event probability, or an indication of how likely it is that a particular query corresponds to a specified or designated audio type.

In an example embodiment, at operation 206, classifying media includes using a classification model to narrow a universe of available or potential classifications for a particular sample or user. For example, a classification model can include various weights or other means to constrain available paths in a convolutional neural network. In an example embodiment, the first and second users 132 or 152 and/or their respective devices 130 or 150, can be associated with different classification models, and the models can be applied by the media processor circuit 110 to more efficiently classify media. In an example embodiment, a classification model can be selected based on some a priori knowledge of a source device or user history. For example, a particular classification model, from among multiple different available classification models, can be selected for use when the query includes an audio signal sampled from a mobile telephone's microphone.

In an example embodiment, a first query includes media data 201 that includes classical music, and the first query corresponds to a first parameter that indicates that the query includes classical music. The first query can be processed using a neural network configured by a first classification model, and the first classification model can "tune" the network to more efficiently identify classical music due to various weights, filters, or other components of the network that are selected or structured to discern among different characteristics of classical music. A second classification model, such as tuned for recognizing pop music, may not successfully or efficiently identify the first query. Similarly, a second query that includes spoken word content may not be successfully or efficiently classified using either of the first classification model tuned for classical music or the second classification model tuned for pop music.

Various classification models can be applied to provide media classification at operation 210, such as by loading a model stored locally on a device, or by receiving a model via the network-based media classifier 105. Multiple models can optionally be used or applied in series. In an example embodiment, a model can be particular to a specified class of input devices (e.g., devices used to receive or provide the query or media data 201). For example, a first model can be configured to classify speech and music when received from a mobile telephone microphone. A second model can be configured to classify speech and music when received from a mobile telephone's native sound board. A third model can be configured to identify whether query data includes one or both of speech and music. A fourth model can be configured to classify audio from a television broadcast source. Depending on a detected situation or context, such as based on one or more context parameters, one or more classification models can be selected for use in the method 200. In some example embodiments, a model is chosen automatically by detecting the source device, or by comparing the quality of competing models, or by some analysis of the query to be analyzed, among other criteria.

Figure 3:
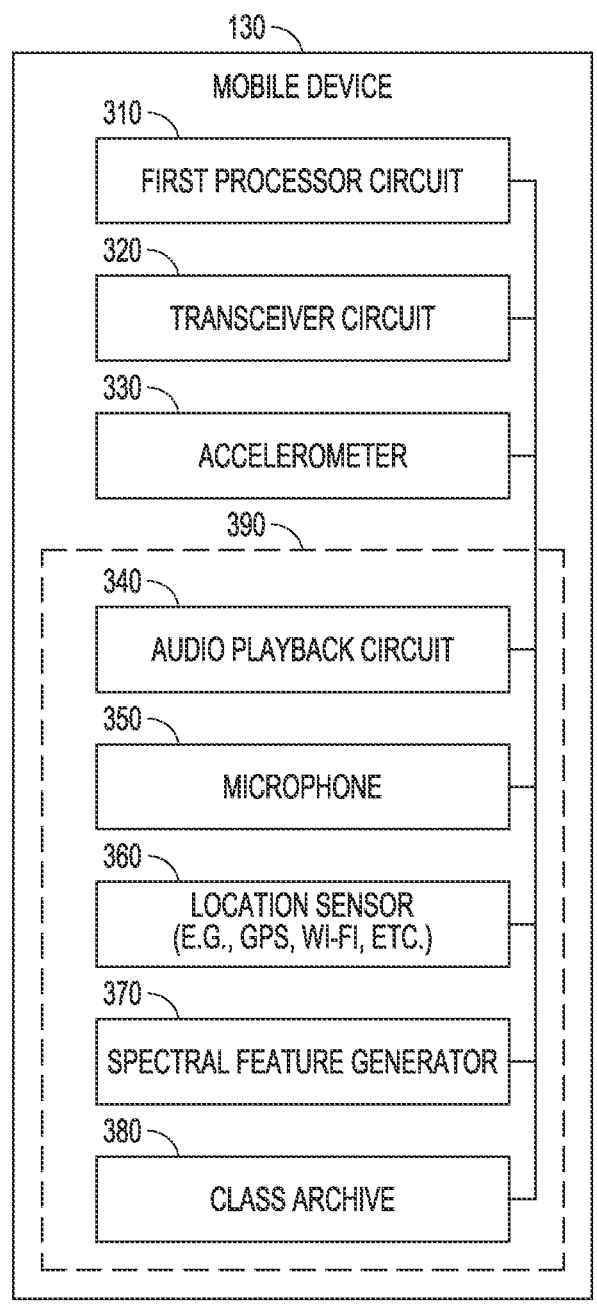
FIG. 3 illustrates generally a block diagram of some components of a mobile device.

FIG. 3 illustrates generally a block diagram of some components of a mobile device. In an example embodiment, FIG. 3 shows a block diagram corresponding to various components of the first mobile device 130. The second mobile device 150 can optionally include the same or similar components. In the example embodiment of FIG. 3, the first mobile device 130 includes a first processor circuit 310, a transceiver circuit 320, an accelerometer 330, and an audio playback circuit 340. The example embodiment includes a microphone 350, a location sensor 360, a signal feature generator 370, and a class archive 380. The various components of the first mobile device 130 can be configured to communicate with each other (e.g., via a bus, shared memory, or a switch).

The transceiver circuit 320 can be configured to enable communication between the first mobile device 130 and the network 190, for example, using a wired or wireless communication protocol. In an example embodiment, the transceiver circuit 320 is configured for WiFi or cellular network communications with the network 190. In an example embodiment, the transceiver circuit 320 is configured to receive a broadcast signal, such as a television signal, a radio signal, or other signal that includes digital or analog media signal information.

In an example embodiment, the audio playback circuit 340, microphone 350, location sensor 360, signal feature generator 370, and class archive 380 can form all or part of an app 390, such as can include a software application configured to be executed or instantiated on a mobile hardware device or one or more other devices. In an example, the app 390 is stored (e.g., installed) on the first mobile device 130 and is executable by the first mobile device 130 by one or more processor circuits, such as the first processor circuit 310. In an example embodiment, the app 390 is stored, at least in part, at the cloud 118, and the app 390 interfaces with one or more of the components of the first mobile device 130. In an example embodiment, the one or more processor circuits in the first mobile device 130 can be included (e.g., temporarily or permanently) in the app 390, transceiver circuit 320, accelerometer 330, or any suitable combination thereof. In an example embodiment, the first mobile device 130 is configured to interact with the network-based media classifier 105 via the app 390 to classify media present at (e.g., media played by) or near (e.g., media able to be received or sensed by) the first mobile device 130.

In the example embodiment of FIG. 3, the first mobile device 130 includes various inputs that are configured to sample or receive media information. For example, audio signal information can be sampled from the audio playback circuit 340, or audio signal information can be received using the microphone 350. In an example embodiment, the first mobile device 130 further includes one or more sensors or inputs that can be used to identify or provide corresponding one or more context parameters. For example, the location sensor 360 can include a GPS sensor, a WiFi transceiver, or other sensor that can be configured to determine or provide information about a location of the first mobile device 130. In an example embodiment, the first mobile device 130 is associated with one or more context parameters by programming or by a user-input.

The signal feature generator 370 can be included at the first mobile device 130, at the network-based media classifier 105, or at some other location or device that is communicatively coupled with the first mobile device 130 or the network-based media classifier 105. The signal feature generator 370 can be configured to identify or extract various media data features, such as spectral, temporal, or other features, from a media signal provided by the first mobile device 130. For example, the signal feature generator 370 can receive an audio sample from the audio playback circuit 340 or from the microphone 350 and then extract, using digital signal processing (DSP) methods, various features from the audio sample. In an example embodiment, mel-frequency cepstral coefficients (MFCC), spectral flatness, mean value, zero crossings, spectral centroid, chord class, or percussiveness, among other features, can be determined or provided by the signal feature generator 370 based on a media sample. The various features extracted or identified using the signal feature generator 370 can be considered to be a fingerprint that uniquely corresponds to the signal to be identified or classified.

The class archive 380 can include one or more indications of classifications, classification models, or other information that can be applied by the app 390 (e.g., in coordination with other components of the network-based media classifier 105) to classify query media. The classifications, classification models, or other information can be associated with the first user 132 and/or with the first mobile device 130, and can be applied to narrow a search in a convolution neural network to identify or classify a media sample. In an example embodiment, the class archive 380 includes a user identification code that is applied by the network-based media classifier 105 to retrieve, from the database 115, one or more classification models associated with the first user 132 and/or with the first mobile device 130. In an example embodiment, the class archive 380 includes various classification models that can be applied by the app 390 and/or by the network-based media classifier 105 to classify media provided by the first mobile device 130.

Figure 4:
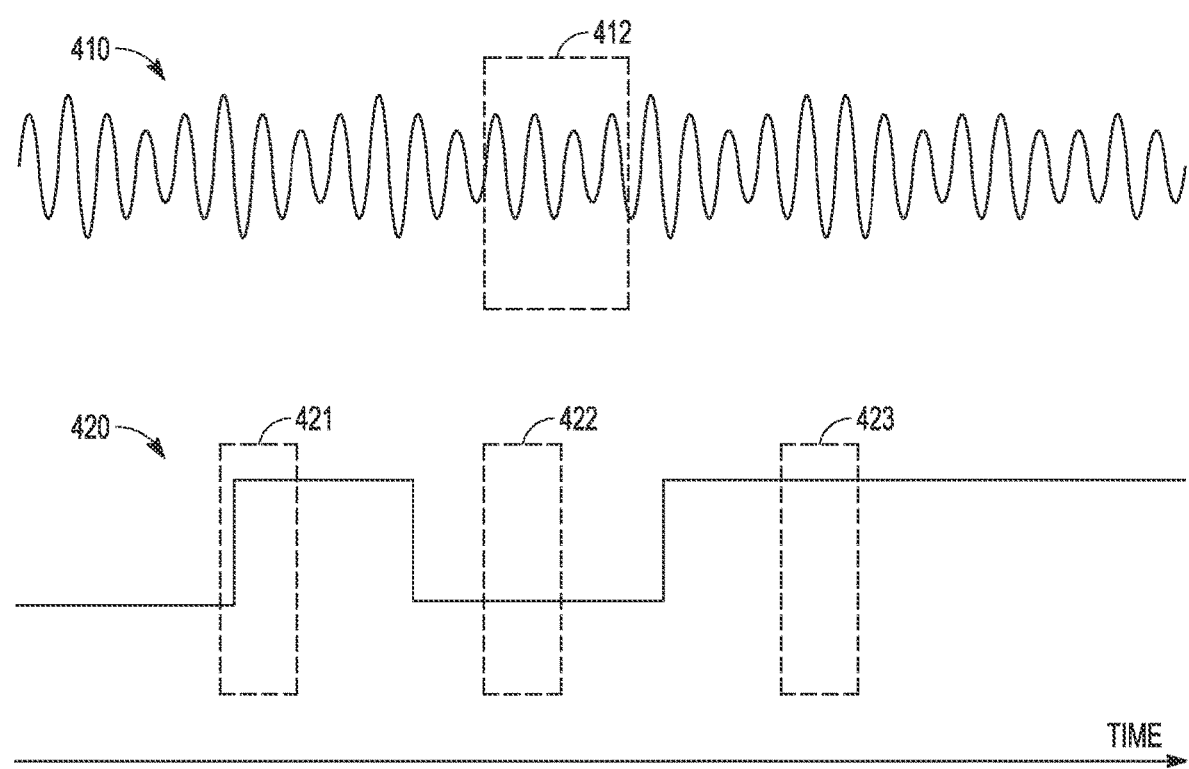
FIG. 4 illustrates generally an example embodiment that includes a query sound waveform and a context sensor signal.

FIG. 4 illustrates generally an example that includes a query sound waveform and a context sensor signal. The query sound waveform can comprise all or a portion of media data 201 that is indicated to be identified or classified. In an example embodiment, the query sound waveform 410 can be received using the audio playback circuit 340 or the microphone 350 of the first mobile device 130.

FIG. 4 includes the context sensor signal 420, such as can be received from the first mobile device 130, or can be determined using information about the first mobile device 130 and/or a user. For example, the context sensor signal 420 can include information from the location sensor 360 that indicates a location of the first mobile device 130. In an example embodiment, an audio sample 412 can include a segment of the query sound waveform 410. The audio sample 412 can be used as the media data 201 for classification, for example, according to the method 200.

The context sensor signal 420 can represent context information that corresponds to the query sound waveform 410. For example, the context sensor signal 420 can be received concurrently with the query sound waveform 410. In the example embodiment of FIG. 4, the context sensor signal 420 includes position information, such as can be determined using the accelerometer 330 of the first mobile device 130. The context sensor signal 420 includes, for example, a binary indication of whether the first mobile device 130 is at rest (signal low) or in motion (signal high). Context information can be sampled from the context sensor signal 420 at various intervals, or context information can be sampled when a change is identified in the context sensor signal 420. For example, first context data 421 can correspond to a first state change in the context sensor signal 420. Second and third context data 422 and 423 can correspond to periodic samples of the context sensor signal 420, for example, after some threshold context event is identified. Other context information can additionally or alternatively be used, as further discussed herein.

Figure 5:
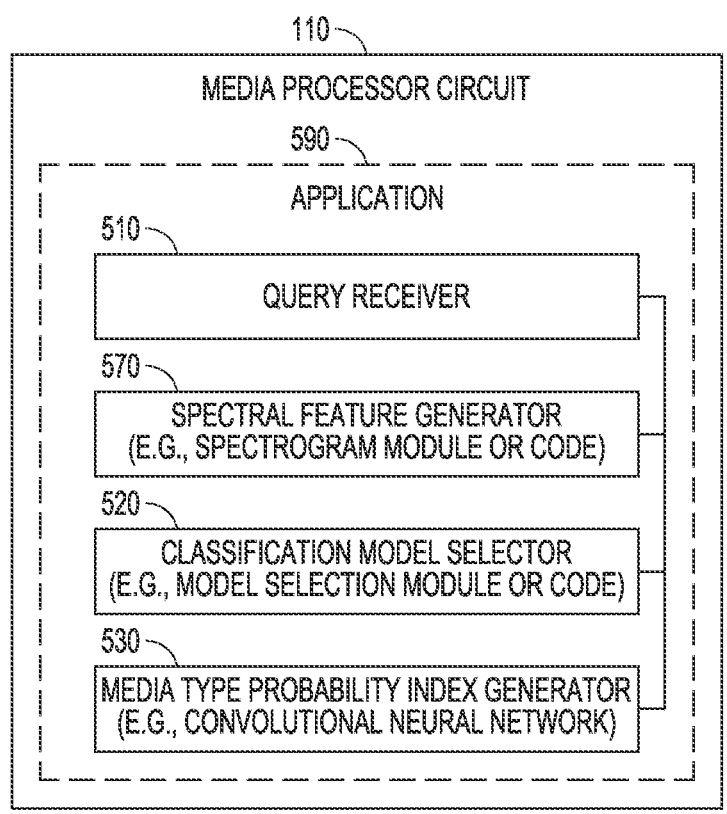
FIG. 5 illustrates generally a block diagram of a media processor circuit.

FIG. 5 illustrates generally a block diagram of a media processor circuit, such as the media processor circuit 110. The media processor circuit 110 can include various components that can work together with, or independently from, the components of the first mobile device 130 (see, e.g., FIG. 3). In the example embodiment of FIG. 5, the media processor circuit 110 includes a query receiver 510, a classification model selector 520, and a media type probability index generator 530. In an example embodiment, the media processor circuit 110 further includes a signal feature generator 570.

In an example embodiment, the query receiver 510, the classification model selector 520, and the media type probability index generator 530 can form all or part of an app 590 that is stored (e.g., installed) at the network-based media classifier 105, and is executable by the media processor circuit 110, or by one or more other processor circuits, to perform media classification services. In an example embodiment, the app 590 is stored, at least in part, at the cloud 118, and the app 590 interfaces with one or more of the components of the first and second mobile devices 130 and 150.

The query receiver 510 can be configured to receive query media, such as the media data 201, that is indicated for classification. In an example embodiment, the query receiver 510 receives the media data 201 from one of the first and second mobile devices 130 and 150. The query receiver 510 optionally acts as a gate to the other components of the media processor circuit 110, such as by verifying that the media data 201 includes a query format or query signal content quality that can be processed by the media processor circuit 110. In an example embodiment, the query receiver 510 is configured to receive one or more context parameters associated with the media data 201.

The media processor circuit 110 can include the signal feature generator 570. The signal feature generator 570 can be independent of, or configured for operation in coordination with, the signal feature generator 370 of the first mobile device 130. The signal feature generator 570 can include code or a processing module that is configured to generate a spectrogram or other spectral content information corresponding to an audio signal sample or video signal sample (e.g., a query media sample). The signal feature generator 570 can be configured to identify or extract various features from the media data 201 received by way of the query receiver 510. For example, the signal feature generator 570 can receive an audio signal sample from the query receiver 510 and then extract, using digital signal processing (DSP) methods, various features from the audio sample. Mel-frequency cepstral coefficients (MFCC), spectral flatness, mean value, zero crossings, spectral centroid, chord class, or percussiveness, among other features, can be determined by the signal feature generator 370.

The classification model selector 520 can include software code or a processing module or circuit that is configured to use information about at least one context parameter (e.g., a context parameter received using the query receiver 510) to select a classification model for use in classifying a media sample. The at least one context parameter can optionally be derived by the classification model selector 520 or by another module, such as by analyzing the query media to be identified, for example, to determine whether the query media includes music, speech, or a combination of music and speech.

In an example embodiment, the classification model selector 520 communicates with the database 115 to retrieve one or more classification models from the database 115. An example of the database 115 is discussed below at FIG. 6. The classification model selector 520 and/or the database 115 can provide recommendations for various classification models to use, for example, based on the context parameter(s) and/or spectral features (e.g., identified by the signal feature generator 370 or 570) associated with the query to be identified.

The media type probability index generator 530 is configured to apply the spectral feature information from the signal feature generators 370 and/or 570 to a classifier network to generate a probability index, or likelihood, that a query corresponds to a specified media type. In an example embodiment, a media type can include a media category (e.g., spoken word, music, classical music, newscast, etc.) or a media type can include an indication of a specified source or specified work, such as a song, TV program (e.g., including an indication of a specific episode), or performer. That is, in an example embodiment, the media type probability index generator 530 can provide an indication of a likelihood that a query corresponds to a specified recording of a specified song by a specified artist. In another example embodiment, the media type probability index generator 530 can provide an indication of a likelihood that a query corresponds to a specified artist.

Figure 6:
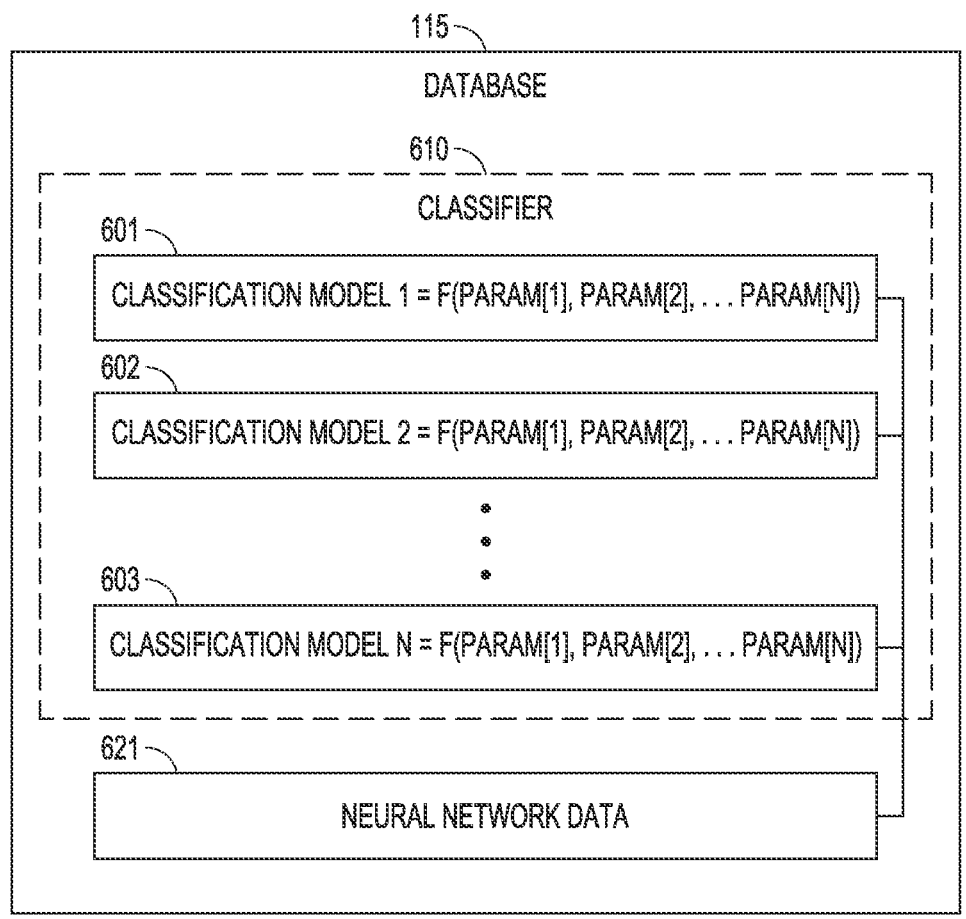
FIG. 6 illustrates generally a block diagram of a database for storing classification models.

FIG. 6 illustrates generally a block diagram of a database for storing classification models. The block diagram of FIG. 6 can correspond to the database 115. The database 115 can be communicatively coupled with the media processor circuit 110 and/or the network 190 to provide, among other things, various classification models and neural network data 621 for classifying media. The neural network data 621 can include various structural, filter, or weighting information for use in a convolutional neural network, or in some other similar tool that can provide model-based classification services.

In an example embodiment, the database 115 in FIG. 6 includes a classifier 610 that includes multiple classification models 601, 602, and 603. A first classification model 601 is a function of multiple parameters (PARAM[1], PARAM[2], . . . , PARAM[n]). That is, given a set of parameters, such as including but not limited to context parameters, the classifier 610 can return a corresponding classification model for use by the media processor circuit 110. The parameters can correspond to context parameters, spectral features, or other information associated with one or more of a query, device, user, or other input. A second classification model 602 can be a function of the same or different multiple parameters. The classifier 610 can include n classification models that correspond to different combinations of parameters. In an example embodiment, a specified combination of parameters can return multiple different classification models. In an example embodiment, a specified combination of parameters can indicate that several different classification models are selected and can be serially applied.

In an example embodiment, the database 115 can be queried by the media processor circuit 110 whenever at least one parameter changes. For example, in response to a change in a context parameter received from the first mobile device 130, the media processor circuit 110 can query the database 115 to determine whether an updated classification model is indicated by the changed context parameter. If an updated classification model is not indicated, then the media processor circuit 110 can perform its media classification service using a previously received model. If an updated classification model is indicated, then the classifier 610 can transmit information about the new classification model to the media processor circuit 110 for use in present or subsequent classification operations.

Figure 7:
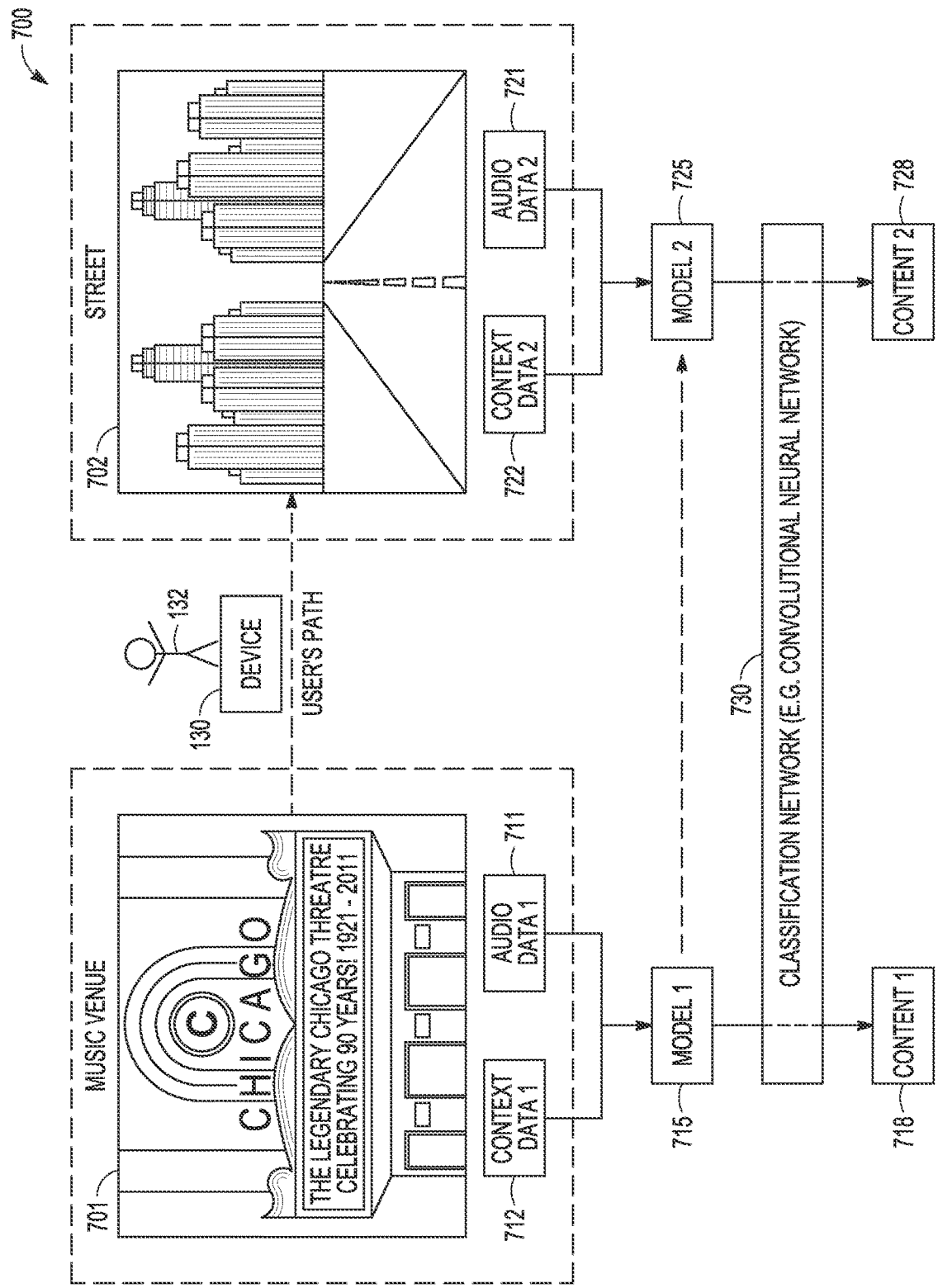
FIG. 7 illustrates generally an example embodiment of using a classification network to identify media content.

FIG. 7 illustrates generally an example of using a classification network to identify media content. FIG. 7 includes an example 700 of using a classification network, such as a convolutional neural network tuned for a particular media type, to classify media. In the example embodiment, the first user 132 and the first mobile device 130 are illustrated as traveling between a first location 701 (e.g., a music venue) and a second location 702 (e.g., the street outside of the music venue). In the example embodiment of FIG. 7, the first mobile device 130 can be configured to sample first audio data 711. In an example embodiment, the first audio data 711 is representative of live music being played at the first location 701.

The first mobile device 130 can be further configured to identify first context data 712. In an example embodiment, the first context data 712 includes one or more of GPS location information identifying the first location 701, user information about the first user 132 (e.g., calendar entry information, owned music library information, playlist or listening history, etc.), or other information that can be used to identify one or more of the first location 701 and the first user 132.

In an example embodiment, a media identification query can be generated by the first mobile device 130 to identify audio content at the first location 701. The media identification query can be generated automatically by the first mobile device 130, such as based on a specified schedule or on a detected change in ambient sound content of the first location 701, or the query can be generated in response to a user input (e.g., received from the first user 132) at the first mobile device 130.

The first mobile device 130, such as using the app 390, can be configured to provide the first audio data 711 to the network-based media classifier 105. In an example embodiment, the first mobile device 130 additionally provides the first context data 712 to the network-based media classifier 105. At the network-based media classifier 105, a first classification model 715 can be retrieved from the database 115, and then applied using the media processor circuit 110 to provide a media type probability index that corresponds to the first audio data 711. The first context data 712 can influence which one or more of n available classification models is selected for use with the first audio data 711. In an example embodiment, the media processor circuit 110 applies the first classification model 715 in a convolutional neural network to identify, in the first audio data 711, a first indication of media content 718, such as corresponding to a song being played at the first location 701. In an example embodiment, applying the first classification model 715 includes applying various weights or other parameters in a convolutional neural network, such as using the media processor circuit 110, to process and identify the first audio data 711.

In the example embodiment of FIG. 7, the first user 132 transitions or relocates from the first location 701 to the second location 702. In response to the detected change in location, such as indicated by a change from the first context data 712 to the second context data 722, the first mobile device 130 can sample second audio data 721 that is representative of the new environment, that is, representative of the second location 702. The sampling and re-sampling of the audio data can be triggered in various ways. In an example embodiment, the sampling can be performed automatically in response to a detected change in the location or context of the first user 132. In an example embodiment, the sampling can be performed in response to a user input at the first mobile device 130. In an example embodiment, the sampling can be performed periodically or at some specified interval. The sampling can be triggered in response to other detected changes associated with the first user 132 and/or with the first mobile device 130.

The second audio data 721, such as together with the second context data 722, can be provided to the network-based media classifier 105. The network-based media classifier 105 can optionally identify a different classification model, such as a second classification model 725, to apply using the convolutional neural network to generate an indication of a media type for the second audio data 721. In an example embodiment, the media processor circuit 110 applies the second classification model 725 at the classification network 730 to identify, in the second audio data 721, a second indication of media content 728, such as corresponding to a different second song being played at the second location 702. In the example embodiment of FIG. 7, the different second song could be played by an outdoor speaker system of a nearby restaurant.

Figure 12:
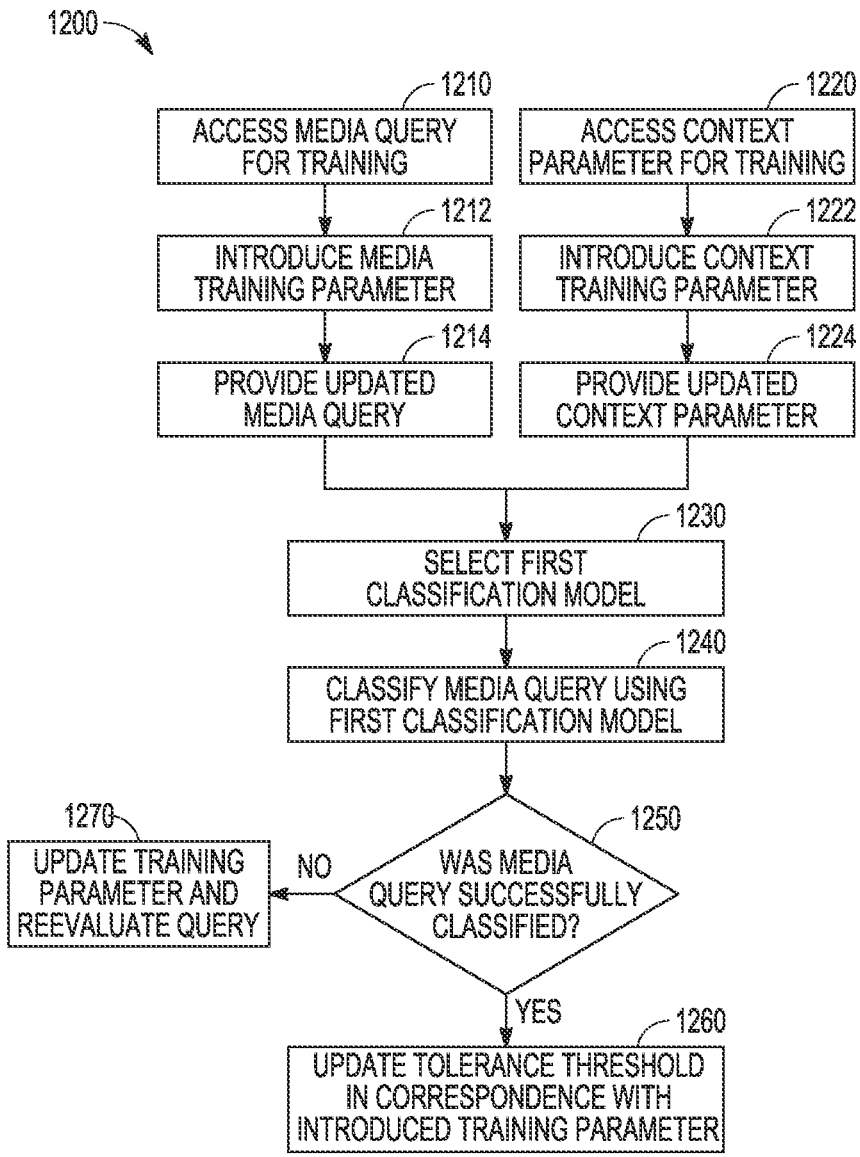
FIG. 12 illustrates generally an example embodiment that includes training a media query identification system.
Figure 13:
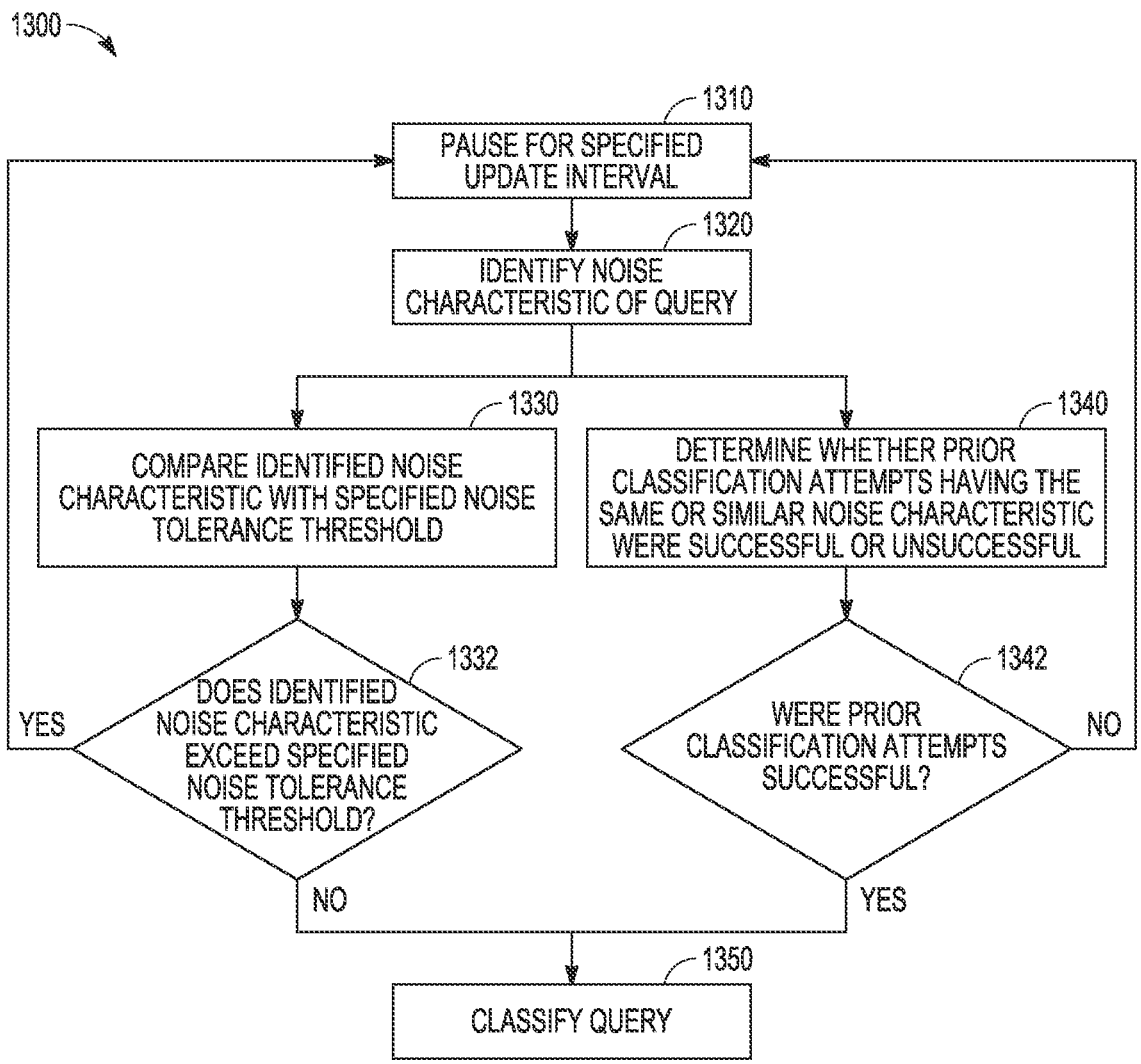
FIG. 13 illustrates generally an example embodiment that includes determining whether to classify a media query.

FIGS. 8-11 illustrate generally examples of determining media type probabilities, selecting different classification models for use in a classification network (e.g., a convolutional neural network trained to identify various media), and using context parameters, among other things. FIGS. 12 and 13 illustrate generally examples of training a neural network, and determining when or whether to expend computational resources to provide media classification services, such as using a convolutional neural network, based on one or more characteristics of a media query to be identified. Each of the methods can be implemented using code that can be executed using the systems, methods, or devices described herein.

Figure 8:
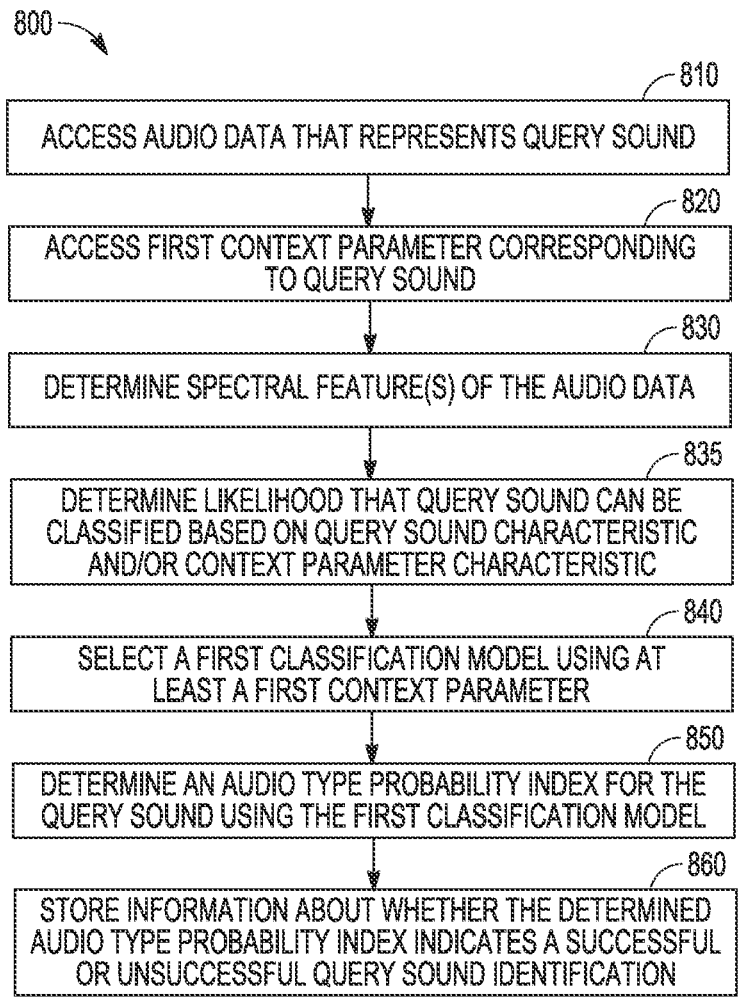
FIG. 8 illustrates generally an example embodiment that includes determining an audio type probability index.

FIG. 8 illustrates generally an example embodiment that includes determining an audio type probability index. The example embodiment can include a first process 800 comprising multiple different steps or operations. At operation 810, the example embodiment includes accessing audio data or an audio signal that represents a query sound to be identified. Accessing audio data can include, among other things, receiving or identifying an audio sample using various portable or fixed electronic devices, such as including cellular telephones, televisions, or tablet computers, among other devices. In an example embodiment, accessing audio data includes monitoring the audio playback circuit 340 or sampling ambient audio information using the microphone 350 of the first mobile device 130.

At operation 820, the example embodiment includes accessing a first context parameter. The first context parameter can correspond to the query sound from 810, and/or the context parameter can correspond to a device, a user, or can otherwise be associated with the query sound accessed at operation 810. A context parameter that corresponds to a query sound can include time-varying context signal information that is received substantially concurrently with, or recently before or after, the query sound. In this manner, the context parameter can provide information about what is or what may be occurring at or near the location or time at which the query sound is accessed. In an example embodiment, a context parameter that corresponds to a query sound can be substantially time-invariant, such as can include information about a user identification, or a device type, among other things.

In an example embodiment, accessing the first context parameter at operation 820 includes receiving location information from the location sensor 360 of the first mobile device 130. For example, the first context parameter can include location information (e.g., GPS or other coordinates) that is determined using the location sensor 360. The location information can be associated with a particular query sound that is recorded or sampled when the location was determined.

At operation 830, the example embodiment includes determining spectral features of audio data, for example, of the audio data accessed at operation 810. Determining spectral features can include, among other things, using digital signal processing (DSP) methods to identify mel-frequency cepstral coefficients (MFCC), spectral flatness, mean value, zero crossings, spectral centroid, or other extractable features. Various digital signal processing feature extraction methods and standards (e.g. MPEG-7) can be used. Determining spectral features at operation 830 can include using one or more of the first processor circuit 310 of the first mobile device 130, the media processor circuit 110 of the network-based media classifier 105, or some other processor or circuit to receive and analyze a digital audio sample that is to be classified.

At operation 835, the example embodiment can include determining a likelihood that the query sound can be positively classified based on a query sound characteristic or based on a context parameter characteristic. The query sound and/or context parameter can optionally be analyzed (e.g., using one or more of the first processor circuit 310 of the first mobile device 130, the media processor circuit 110 of the network-based media classifier 105, or some other processor or circuit to receive and analyze a digital audio sample that is to be classified) to identify a characteristic or feature that can be used or compared to a specified threshold characteristic or threshold feature to provide an indication of a likelihood that the query can be classified. In an example embodiment, operation 835 can include using the spectral feature(s), determined at operation 830, to determine the likelihood that the query sound can be positively identified.

Although operation 835 is illustrated as following operations 820 and 830, the determination at operation 835 can be performed substantially immediately following acquisition of the query sound (e.g., following operation 810), or can be performed for the context parameter substantially immediately following acquisition of the context parameter (e.g., following operation 820). Based on the result of operation 835, the process 800 can continue at operation 840. For example, if the likelihood determined at operation 835 is above a specified threshold likelihood that the query sound can be identified, then the process 800 can continue at operation 840 with selecting a classification model for use in classifying the query sound. If the likelihood determined at operation 835 is below a specified threshold likelihood, then the process 800 can terminate, or can re-sample one or more of the query sound and/or the context parameter, such as to attempt to acquire a better quality signal for use in a media classification process. An example embodiment that includes determining whether to proceed with a classification, such as based on a characteristic of a media query, is included herein in the discussion of FIG. 13.

At operation 840, the example embodiment includes selecting a classification model for use with the audio data, for example, to be used to identify or classify the audio data. In an example embodiment, selecting the classification model at operation 840 includes using at least one context parameter. The at least one context parameter can be one of multiple parameters used to select or identify a classification model (see, e.g., classification models 601-603 in the example embodiment of FIG. 6). In an example embodiment, the media processor circuit 110 is configured to retrieve a classification model from the database 115 in the network-based media classifier 105. The retrieved classification model can include parameters for use with a neural network that can be tuned (e.g., by the retrieved model) to identify or classify the query sound based on the audio data.

At operation 850, the example embodiment includes determining an audio type probability index for the query sound using the first classification model. In an example embodiment, determining the audio type probability index includes performing comparative analyses of the various spectral features (e.g., determined at operation 830) at one or multiple nodes in a neural network to identify an audio type or a probability index that indicates that the audio data is likely to correspond to a specified audio type or audio content. In an example embodiment, determining the audio type probability index includes using the audio data, the first classification model, and a trained classifier network. In an example embodiment, determining the audio type probability index includes classifying or identifying the query sound by title, artist, source, or otherwise positively identifying a correlation between the query sound and a particular characteristic.

At operation 860, the example embodiment can include storing information about whether the audio type probability index, such as determined at operation 850, indicates that the query sound was successfully or unsuccessfully classified, that is, whether the query was properly identified, misidentified, or not identified. Operation 860 can optionally be performed during normal system use, or during a training process. An example of a training process is illustrated below at FIG. 12.

At operation 860, whether a classification operation is successful or not can be determined automatically, such as by identifying that one or more characteristics of the query sound, the context parameter, and/or the audio type probability index, exceeds a specified threshold characteristic (i.e., by using an objective measure). In an example embodiment, whether a classification operation is successful or not can be indicated by a user responding to an inquiry about whether the user accepts or rejects a result of the classifier.

A query sound can be unsuccessfully classified or misidentified for numerous reasons. For example, a poor quality or noisy media signal can be difficult to analyze, or can yield spectral features or a signal fingerprint that does not accurately correspond to underlying media signal content, such as due to masking by noise or other signal anomalies. Noise can be introduced in a media signal when the media signal is sensed using an environment sensor like a microphone, or can be introduced by electrical or electromagnetic noise, or via other means. A poor quality or noisy context parameter can be similarly difficult to analyze if it is noisy or if it includes anomalies that lead to a misinterpretation. If one or more of the query sound and/or the context parameter are noisy or inaccurate, then the classification model selected at operation 840 can be improper and, as a result, the determined audio type probability index can be poor.

In an example embodiment, the information stored at operation 860 includes relative or absolute information about the success (or lack of success) in classifying or identifying the query sound, and optionally includes information about a correspondence between the success and one or more characteristics of the query sound, the context parameter, or the classification model(s) used. The stored information can be later retrieved and compared to a new query sound, context parameter, or model, such as for use in identifying a likelihood that a classification of the new query sound will be successful. If the likelihood of success is too low, then a classification process can be suspended in order to preserve computational resources or power for other tasks.

Figure 9:
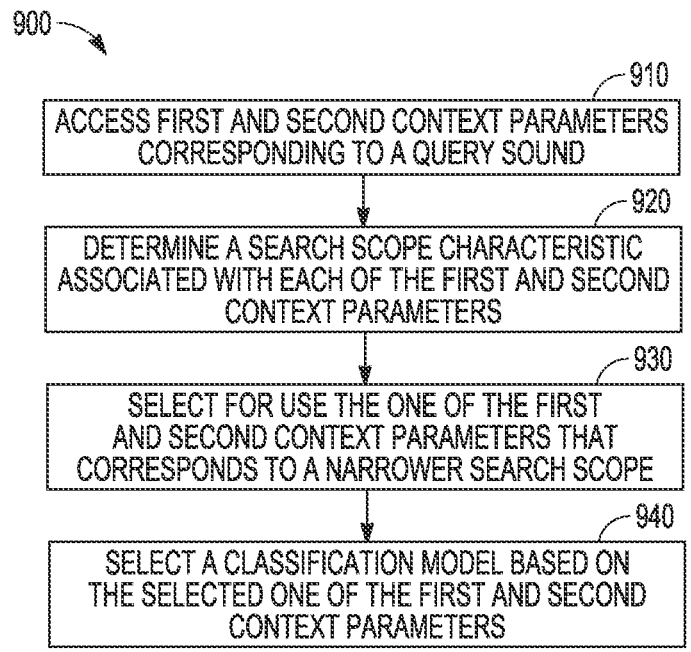
FIG. 9 illustrates generally an example embodiment that includes selecting a classification model based on context parameters.

FIG. 9 illustrates generally an example embodiment 900 that includes selecting a classification model based on context parameters. The example embodiment can include selecting among multiple different classification models that are available for use in a classification network.

At operation 910, the example embodiment includes accessing first and second context parameters corresponding to a query sound. The first and second context parameters can be of the same type or format (e.g., both can include location information or coordinates, time stamp information, user profile information, etc.), or the context parameters can be different. One or both of the first and second context parameters can be determined using, or can be derived from, an audio sample or query sound to be identified. One or both of the context parameters can be determined based on sensor information, user information, or other information that can indicate a characteristic of an audio sample, or can indicate a characteristic of a user or device that is associated with an audio sample. In an example embodiment, the media processor circuit 110 and/or the first processor circuit 310 can access the first and second context parameters at operation 910.

At operation 920, the example embodiment includes determining a search scope characteristic that is associated with each of the first and second context parameters. For example, a first search scope can be associated with the first context parameter, and a different second search scope can be associated with the second context parameter. In an example embodiment, the first context parameter includes GPS coordinates for the first mobile device 130. A first search scope associated with the GPS coordinates can be relatively narrow, for example, if it can be determined that the GPS coordinates correspond to the first location 701. In this case, a search scope characteristic can optionally be narrowed to include only media context that is known to be associated with the first location 701 (e.g., as can be determined by a calendar of events associated with the first location 701, or other prior or programmed information about the first location 701).

In an example embodiment, the second context parameter includes an indication of a device type that was used to acquire query data. In this example, the second context parameter can include information indicating that audio data or a query sound of interest was acquired using the first mobile device 130. Using information about the source of the query sound, for example, a search scope characteristic can be narrowed or tuned to identify media that is most likely to be received by a mobile device. Additionally or alternatively, one or more pre-processing filters can be tuned to optimize spectral information sampled from a mobile device.

At operation 930, the example embodiment includes selecting one of the first and second context parameters. The selected one of the context parameters can be used to select a classification model at operation 940 (see, e.g., FIG. 8 at operation 840). That is, the selection of a particular classification model at operation 940 can be based on, or informed at least in part by, the selected one of the context parameters.

In an example embodiment, a context parameter that is selected for use can be a context parameter that corresponds to a relatively narrower search scope. When the search scope is narrower, performing media classification can be more focused and less processing resources are thus consumed. Accordingly, in the example embodiment above, the first context parameter can be selected when the GPS coordinates correspond to a smaller or more narrow set of potential media classifications, such as compared to the second context parameter that can correspond to any or all media that can or is likely to be sampled by a mobile device.

Selecting the classification model at operation 940 can include using the selected one of the first and second context parameters. In some examples, different weights can be associated with different context parameters, and multiple context parameters can be used to select a classification model (see, e.g., FIG. 6 at classifier 610 that includes multiple classification models, and each different model can be a function of multiple different parameters). Selecting the classification model at operation 940 can include using the media processor circuit 110 to retrieve the selected classification model and to apply the selected classification model in the context of a neural network that is configured to provide an indication of a media type.

Figure 10:
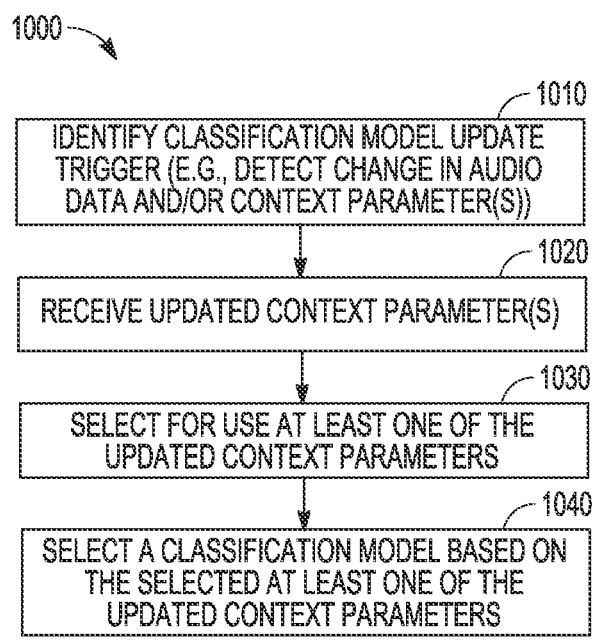
FIG. 10 illustrates generally an example embodiment that includes selecting an updated classification model.

FIG. 10 illustrates generally an example embodiment 1000 that includes selecting an updated classification model. The example embodiment can include receiving and parsing updated context parameter information. Some portions of FIG. 10 correspond generally to the example embodiment illustrated at FIG. 7.

At operation 1010, the example embodiment can include identifying a classification model update trigger. Identifying an update trigger can include, among other things, determining that a query sound characteristic has changed (e.g., determining that one or more of a tone, amplitude, timbre, percussiveness, or other quality is different than in an earlier query sound or sample), determining that an update interval has elapsed, or determining that a context parameter associated with a query sound has changed by more than a specified threshold amount. Referring again to the example at FIG. 4, an update trigger can be provided, for example, based on the first context data 421, such as can be associated with a change in the state of the context sensor signal 420. In an example embodiment, the classification model update trigger can be identified by a source device (e.g., by the first or second mobile device 130 or 150), by the media processor circuit 110, by a user input to a source device and/or to the network-based media classifier 105, or by other means.

At operation 1020 of FIG. 10, the example embodiment includes receiving at least one updated context parameter. For example, in response to identifying the classification model update trigger, the media processor circuit 110 or other component can request an updated context parameter, such as to evaluate whether a classification model update is required or desired. At operation 1020, the example embodiment can include receiving an updated context parameter based on a change in a continuous or intermittent query stream, or receiving the updated context parameter based on a detected change in device status (e.g., a change in location or change in user). In the context of FIG. 7, for example, receiving an updated context parameter can include using the first mobile device 130 (or other device or process) to receive and recognize the first context data 712 and the different second context data 722.

If more than one context parameter update is identified, then at operation 1030 the example embodiment includes selecting at least one of the updated context parameters for use in selecting a classification model. In an example embodiment, a context parameter corresponding to a narrower classification of media is selected at operation 1030, such as to narrow the scope of a search performed by the network-based media classifier 105. At operation 1040, the example embodiment includes selecting a classification model based on the updated context parameter(s). The selected classification model can be applied as described above for classifying query media associated with the updated context parameter(s).

Figure 11:
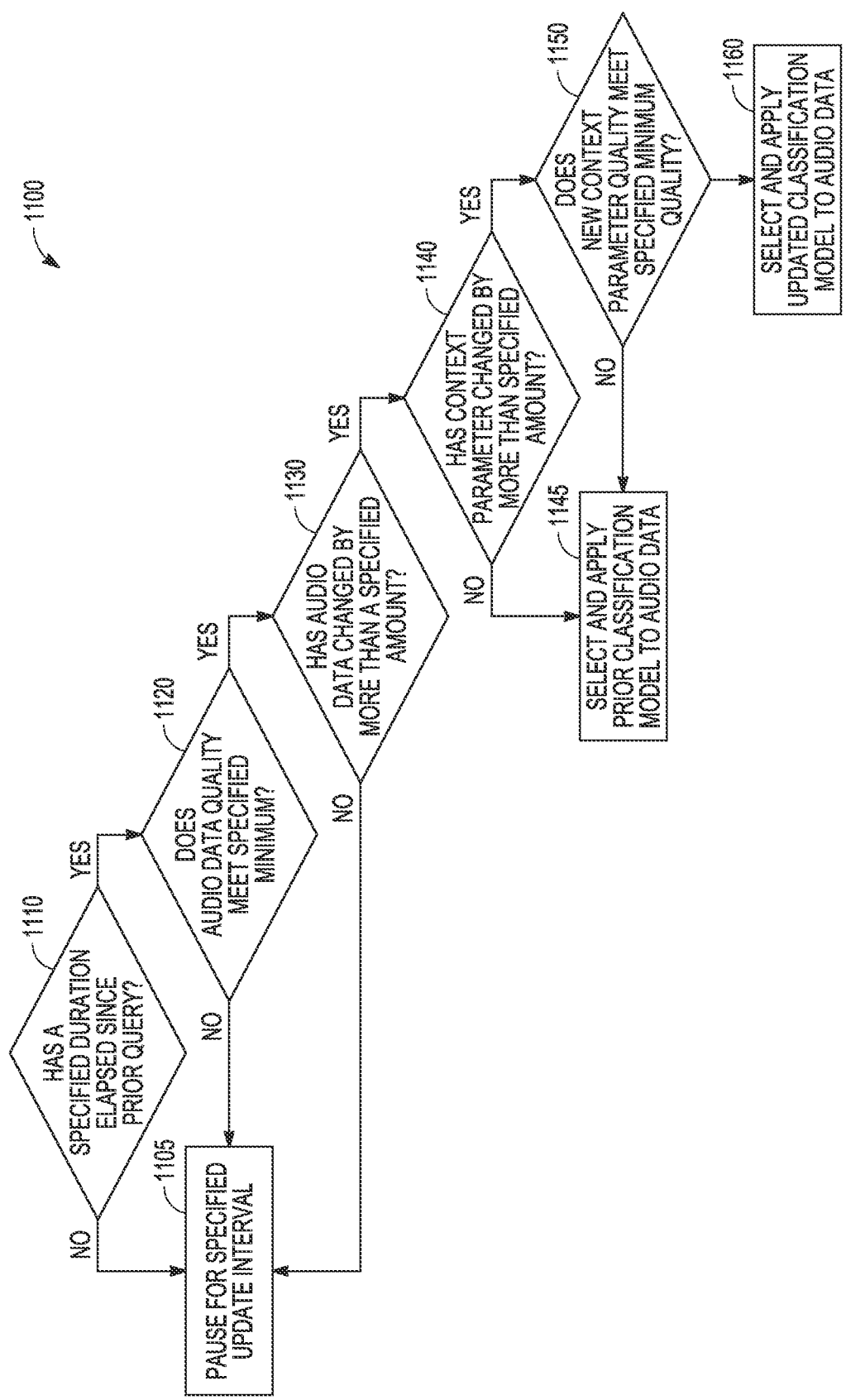
FIG. 11 illustrates generally an example embodiment that includes determining when to apply an updated classification model.

FIG. 11 illustrates generally an example embodiment 1100 that includes determining when to apply an updated classification model. For example, various considerations can be evaluated to determine whether or when to expend resources in updating a context parameter, or retrieving or applying an updated classification model.

At operation 1110, a processor circuit such as the media processor circuit 110 can determine whether a specified duration has elapsed since a prior query was classified. The specified duration can represent a minimum "retry" or "reclassify" interval between queries. At operation 1105, if the specified duration has not elapsed, then the system can pause for a specified update interval. Upon expiration of the update interval, the query can proceed.

At operation 1120, the media processor circuit 110, the first processor circuit 310, or other processor can be used to analyze a query for quality. If the query includes audio signal information that is deemed to be too noisy or too quiet (i.e., the query has insufficient signal content) for use in a classification network, then the method can return to 1105. After pausing for a specified interval, a query can be re-sampled such as to see if noise or amplitude levels have changed. In some examples, some networks or classification models can be more tolerant of noise. In other examples, a priority indication or user-override can be provided to force the network to process a noisy signal.

If the query is determined to have a sufficient minimum signal quality, then at operation 1130 the example embodiment can include determining whether the query itself has changed by more than some specified threshold amount. If the query itself is reasonably unchanged from a prior query (e.g., in frequency content, tone, percussiveness, or other quantitative or qualitative measure), then the system can assume that a prior query still represents present query content to be identified, and a reclassification can be avoided or delayed. The example embodiment can include a return to 1105 to pause, and a new query can be generated after a specified interval or after identification of a trigger event.

If the query is sufficiently different from an earlier query, then at operation 1140, the example embodiment can include determining whether a context parameter associated with the query has changed by more than a specified threshold amount. If the context parameter has not changed, or if a new context parameter is not available, then the example embodiment can continue at operation 1145 by selecting or applying a prior classification model to the query. If the context parameter is determined to have changed by more than the specified threshold amount, or if a new context parameter is available, then the example embodiment can continue at operation 1150 by determining whether the changed or new context parameter itself meets some specified minimum signal quality. For example, if a context parameter includes noise, or represents an unknown context, then a prior classification model can be used (e.g., at operation 1145). If, however, the context parameter meets the quality threshold, then the example embodiment can continue at operation 1160 by selecting and applying a new classification model, based on the new context parameter, to classify the query.

FIG. 12 illustrates generally an example embodiment 1200 that includes training a media query identification system. The example embodiment can include a process that identifies a tolerance for changes in one or more input signal characteristics. For example, the process can be used to determine how much noise can be tolerated in a media query signal. An amount of noise or variation from a pure or expected media query and/or context parameter can be referred to as a tolerance. If too much noise is present in an input signal, then the noise level exceeds a specified tolerance threshold, and it can be unlikely that a media type classification based on the noisy input signal will be accurate. If a noisy signal can be identified early, such as before an attempt is made to identify or classify a query, then a system can preserve computing resources and/or power by inhibiting media classification services. If less than a specified threshold amount of noise (or other signal characteristic anomaly) is present in a media query, then a system can carry out the media classification process with a reasonable likelihood of success. That is, if an input signal has a noise (or other signal anomaly characteristic) that is less than a specified noise tolerance threshold, then the system can proceed with media classification of the input signal.

At operation 1210, the example embodiment includes accessing a media query for training. At operation 1220, the example embodiment includes accessing a context parameter for training. In an example embodiment, the accessed media query and/or context parameter can be pre-selected, such as by an individual or machine tasked with training a media classification system. At operation 1212, a media training parameter can be introduced. Introducing the media training parameter can include, among other things, adding or changing a noise characteristic, a frequency profile, a frequency filter, or other characteristic of the original media query. That is, introducing the media training parameter at operation 1212 can include intentionally modifying the content or one or more characteristics of the original media query to provide an updated media query at operation 1214. In an example embodiment, the media training parameter corresponds to a specified tolerance threshold, or the media training parameter can be selected to exceed a prior tolerance threshold, such as to test or train one or more new conditions with the classification system.

At operation 1222, a context training parameter can be similarly introduced for the context parameter accessed at operation 1220. Introducing the context training parameter can include intentionally modifying the content or one or more characteristics of the original context parameter to provide an updated context parameter at operation 1224. In some example embodiments, at least one of the media training parameter and the context training parameter is not used, and the updated media query provided at operation 1214 is the same as the original media query accessed at operation 1210, or the updated context parameter provided at 1224 is the same as the original context parameter accessed at operation 1220.

At operation 1230, a first classification model can be selected. The first classification model can be selected based on one or more of the media query, the updated media query, the context parameter, or the updated context parameter. In an example embodiment, the classification model can be selected by a user tasked with training a system, or can be selected automatically by a machine. At operation 1240, the example embodiment can use the first classification model to attempt to classify the updated media query. Operation 1240 can include one or more of providing an indication of a media type (e.g., including an indication of a media source, origin, or other identifying characteristic) corresponding to the media query, or the operation can include providing a likelihood that the media query corresponds to a specified media type.

At operation 1250, the example embodiment can include determining whether the media query was successfully identified, such as based on a priori information about the original media query that was accessed at 1210. If the media query is successfully identified, then the example embodiment can continue at operation 1260 with updating a tolerance threshold. For example, at operation 1260, a tolerance threshold, such as for use in later classification tasks for other media queries, can be updated to correspond to the media training parameter introduced at operation 1212. In an example embodiment, the media training parameter introduced at operation 1212 includes a first noise profile and, when a media query having the first noise profile is successfully classified at operation 1250, then a tolerance threshold corresponding to the first noise profile can be selected for use in later classification tasks for the same or other media queries.

At operation 1250, if the media query is not successfully identified, then the example embodiment can continue at operation 1270 with updating one or both of the media training parameter and the context training parameter. In an example embodiment, updating the training parameters at operation 1270 includes selecting for further analysis a training parameter that corresponds to a different tolerance threshold than was previously used. In an example embodiment, at operation 1270, a tolerance threshold, such as for use in later classification tasks for other media queries, can be updated to correspond to a media training parameter that is previously known to yield successful classifications. In an example embodiment, the media training parameter introduced at operation 1212 includes a first noise profile and, when a media query having the first noise profile is unsuccessfully classified at operation 1250, then a tolerance threshold corresponding to a different second noise profile can be selected for use in later classification tasks for the same or other media queries.

FIG. 13 illustrates generally an example embodiment 1300 that includes determining whether to classify a media query. In an example embodiment, a media query can be previously acquired or accessed, or a media query can be received periodically or intermittently. At operation 1310, the example can include pausing for a specified minimum duration or update interval, such as a specified time from a previous classification event. In an example, after the update interval is elapsed, or in response to a user request for media classification, a noise characteristic of a media query can be identified at operation 1320. In an example embodiment, the noise characteristic can be identified using the media processor circuit 110, or using some other processor circuit, such as can be associated with an input device to the network-based media classifier 105. For example, the first processor circuit 310 of the first mobile device 130 can be used to identify a noise characteristic of a media query received by or prepared by the first mobile device 130.

Based on the noise characteristic identified at operation 1320, a media classification system can be caused to initiate or inhibit a media classification process. It can be advantageous to inhibit or prevent a media classification process from proceeding, for example, to conserve processing capacity of one or more processor circuits for other tasks.

At operation 1330, the example embodiment includes comparing the noise characteristic identified at operation 1320 with a specified noise tolerance threshold. The noise tolerance threshold can be specified by a user, by a programmer, or the noise tolerance threshold can be learned by a system employing various network training operations (see, e.g., the example embodiment of FIG. 12). At operation 1332, if the identified noise characteristic is determined (e.g., by the media processor circuit 110, by the first processor circuit 310, or by another processor circuit associated with a device in the network environment 100) to exceed a specified noise tolerance threshold, then the query can be deemed to be too noisy to classify and the example can return to operation 1310 to pause for an update interval. After the update interval elapses, the example could continue, for example, by sampling or acquiring a subsequent query with a different noise characteristic, and the example could include analyzing the subsequent query to determine whether its different noise characteristic is more suitable for classification. If, at operation 1332, the identified noise characteristic does not exceed the specified noise tolerance threshold, then the example can continue at operation 1350 with classifying the query. For example, the embodiment can continue at operation 840 in the example of FIG. 8 by selecting a classification model for use with the query.

At operation 1340, the example embodiment includes comparing the noise characteristic identified at operation 1320 with a result of a prior classification attempt where the prior classification attempt is for a query having the same or similar noise characteristic. If a prior classification attempt was not successful at identifying or classifying the query having the same or similar noise characteristic, then query classification can be avoided and the example embodiment can return to operation 1310. If, at operation 1342, a prior classification attempt was successful at identifying or classifying the query having the same or similar noise characteristic, then a query classification process can commence or continue, such as at operation 840 in the example of FIG. 8.

Although the example embodiment of FIG. 13 refers to a noise characteristic of a query, other characteristics can be similarly analyzed. For example, instead of a noise characteristic, a frequency content characteristic can be identified and used to determine whether to classify a query. In an example embodiment, a visual characteristic such as a color content characteristic can be identified and used to determine whether to classify a query that includes visual media or video information. Other media characteristics can be similarly analyzed and used as a gate to initiating or inhibiting media classification processes.

Figure 14:
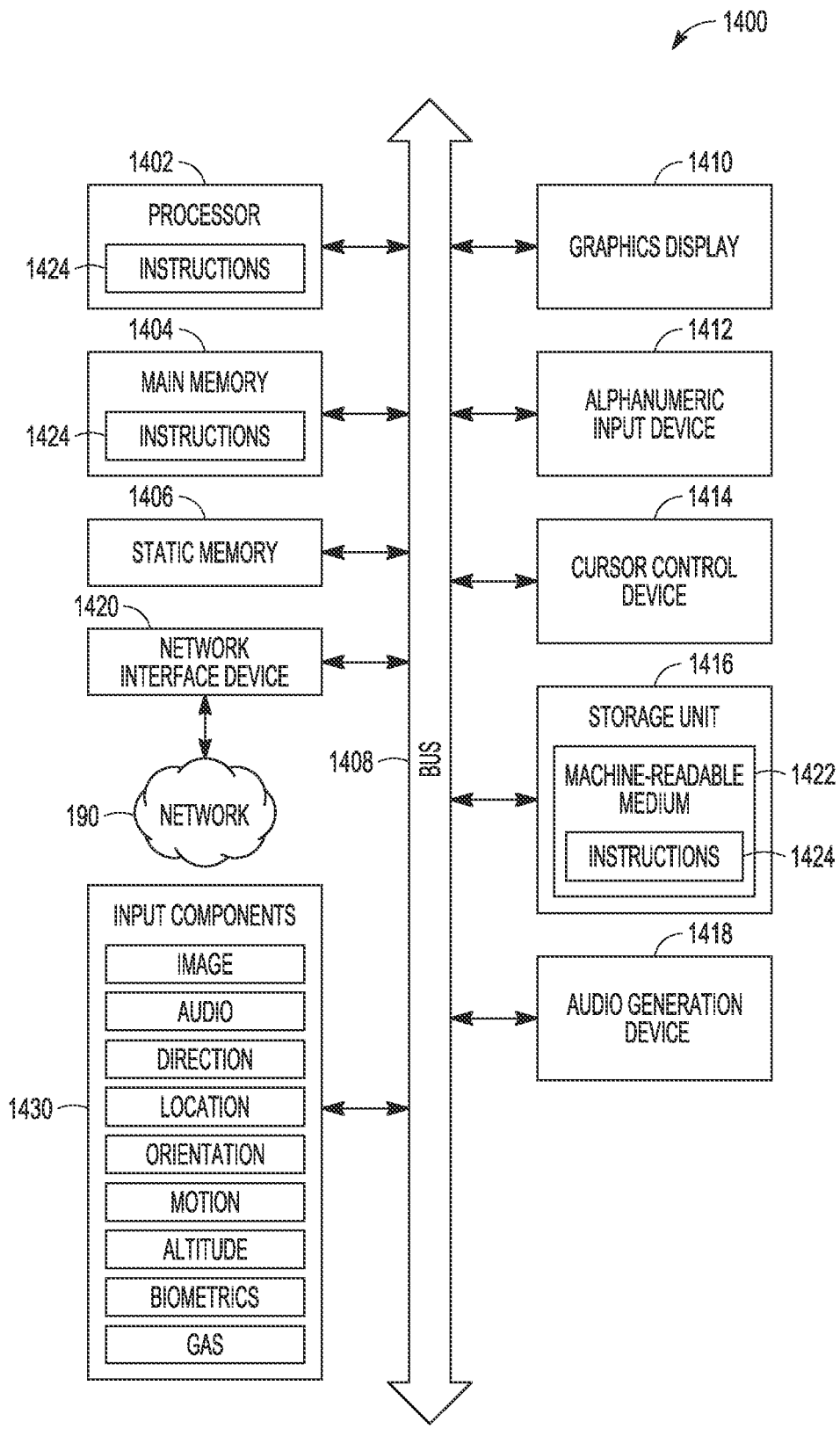
FIG. 14 is a block diagram illustrating components of a machine, according to some examples, that can read instructions from a machine-readable medium and perform any one or more of the methods discussed herein.

FIG. 14 is a block diagram illustrating components of a machine, according to some examples, that can read instructions from a machine-readable medium and perform any one or more of the methods discussed herein. In the example embodiment of FIG. 14, a machine 1400, according to some example embodiments, is able to read instructions 1424 from a machine-readable medium 1422 (e.g., a non-transitory machine-readable medium, a machine-readable storage medium, a computer-readable storage medium, or any suitable combination thereof) and to perform any one or more of the methods discussed herein, in whole or in part. FIG. 14 shows the machine 1400 in the example form of a computer system (e.g., a computer) within which the instructions 1424 (e.g., software, a program, an application, an applet, an app, or other executable code) for causing the machine 1400 to perform any one or more of the methodologies discussed herein can be executed, in whole or in part.

In an example embodiment, the machine 1400 operates as a standalone device or can be communicatively coupled (e.g., networked) to other machines. In a networked deployment, the machine 1400 can operate in the capacity of a server machine or a client machine in a server-client network environment, or as a peer machine in a distributed (e.g., peer-to-peer) network environment. The machine 1400 can be a server computer, a client computer, a personal computer (PC), a tablet computer, a laptop computer, a netbook, a cellular telephone, a smart phone, a set-top box (STB), a personal digital assistant (PDA), a web appliance, a network router, a network switch, a network bridge, or other machine capable of executing the instructions 1424, sequentially or otherwise, that specify actions to be taken by that machine. Further, while only a single machine is illustrated, the term "machine" shall be understood to include any collection of machines that individually or jointly execute the instructions 1424 to perform all or part of any one or more of the methods discussed herein. In an example embodiment, the machine 1400 includes a device that can be used as an input to the network-based media classifier 105, or the machine 1400 can include all or a portion of the network 100.

In the example embodiment of FIG. 14, the machine 1400 includes a processor circuit 1402 (e.g., one or more central processing units (CPUs), one or more GPUs, one or more digital signal processors (DSPs), one or more application specific integrated circuits (ASICs), one or more radio-frequency integrated circuits (RFICs), or any suitable combination thereof), a main memory 1404, and a static memory 1406, which are configured to communicate with each other via a bus 1408. The processor circuit 1402 contains solid-state digital microcircuits (e.g., electronic, optical, or both) that are configurable, temporarily or permanently, by some or all of the instructions 1424 such that the processor circuit 1402 is configurable to perform any one or more of the methodologies described herein, in whole or in part.

The machine 1400 can include a graphics display 1410 capable of displaying graphics or video, and the machine 1400 can include an alphanumeric input device 1412 (e.g., a keyboard or keypad), a pointer input device 1414, a data storage 1416, an audio generation device 1418 (e.g., a sound card, an amplifier, a speaker, a headphone jack, or any suitable combination thereof), or a network interface device 1420.

In an example embodiment, the data storage 1416 (e.g., a data storage device) includes the machine-readable medium 1422 (e.g., a tangible and non-transitory machine-readable storage medium) on which are stored the instructions 1424 embodying any one or more of the methodologies or functions described herein. The instructions 1424 can also reside, completely or at least partially, within the main memory 1404, within the static memory 1406, within the processor circuit 1402 (e.g., within the processor's cache memory), or any suitable combination thereof, before or during execution thereof by the machine 1400. Accordingly, the main memory 1404, the static memory 1406, and the processor circuit 1402 can be considered machine-readable media (e.g., tangible and non-transitory machine-readable media). The instructions 1424 can be transmitted or received over the network 190 via the network interface device 1420. For example, the network interface device 1420 can communicate the instructions 1424 using any one or more transfer protocols (e.g., hypertext transfer protocol (HTTP)).

In an example embodiment, the machine 1400 is a portable computing device (e.g., a smart phone, a tablet computer, or a wearable device), and can have one or more additional input components 1430 (e.g., sensors or gauges), such as discussed herein. Examples of such input components 1430 include an image input component (e.g., one or more cameras), an audio input component (e.g., one or more microphones), a direction input component (e.g., a compass), a location input component (e.g., a global positioning system (GPS) receiver), an orientation component (e.g., a gyroscope), a motion detection component (e.g., one or more accelerometers), an altitude detection component (e.g., an altimeter), a biometric input component (e.g., a heart rate detector or a blood pressure detector), and a gas detection component (e.g., a gas sensor). Input data gathered by any one or more of these input components can be accessible and available for use by any of the components described herein.

As used herein, the term "memory" refers to a machine-readable medium able to store data temporarily or permanently and can be taken to include, but not be limited to, random-access memory (RAM), read-only memory (ROM), buffer memory, flash memory, and cache memory. While the machine-readable medium 1422 is shown in an example embodiment to be a single medium, the term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing the instructions 1424 for execution by the machine 1400, such that the instructions 1424, when executed by one or more processors of the machine 1400 (e.g., processor circuit 1402), cause the machine 1400 to perform any one or more of the methodologies described herein, in whole or in part. Accordingly, a "machine-readable medium" refers to a single storage apparatus or device, as well as cloud-based storage systems or storage networks that include multiple storage apparatus or devices. The term "machine-readable medium" shall accordingly be taken to include, but not be limited to, one or more tangible and non-transitory data repositories (e.g., data volumes) in the example embodiment form of a solid-state memory chip, an optical disc, a magnetic disc, or any suitable combination thereof. A "non-transitory" machine-readable medium, as used herein, specifically does not include propagating signals per se. In some example embodiments, the instructions 1424 for execution by the machine 1400 can be communicated by a carrier medium. Examples of such a carrier medium include a storage medium (e.g., a non-transitory machine-readable storage medium, such as a solid-state memory, being physically moved from one place to another place) and a transient medium (e.g., a propagating signal that communicates the instructions 1424).

Some examples are described herein as including modules. Modules can constitute software modules (e.g., code stored or otherwise embodied in a machine-readable medium or in a transmission medium), hardware modules, or any suitable combination thereof. A "hardware module" is a tangible (e.g., non-transitory) physical component (e.g., a set of one or more processors) capable of performing certain operations and can be configured or arranged in a certain physical manner. In various example embodiments, one or more computer systems or one or more hardware modules thereof can be configured by software (e.g., an application or portion thereof) as a hardware module that operates to perform operations described herein for that module.

One or more of the processor circuits discussed herein can perform operations in a "cloud computing" environment or as a service (e.g., within a "software as a service" (SaaS) implementation). For example, at least some operations within any one or more of the methods discussed herein can be performed by a group of computers (e.g., as examples of machines that include processors), with these operations being accessible via a network (e.g., the Internet) and via one or more appropriate interfaces (e.g., an application program interface (API)). The performance of certain operations can be distributed among the one or more processors, whether residing only within a single machine or deployed across a number of machines, for example, in the network 100 of FIG. 1. In some example embodiments, the one or more processors or hardware modules (e.g., processor-implemented modules) can be located in a single geographic location (e.g., within a home environment, an office environment, or a server farm). In other example embodiments, the one or more processors or hardware modules can be distributed across a number of geographic locations.

Several additional examples follow. Example 1 can include or use subject matter (such as an apparatus, a method, a means for performing operations, or a machine readable memory including instructions that, when performed by the machine, can configure the machine to perform acts), such as can include or use a method for classifying media, the method comprising accessing, using one or more processor circuits, digital media data that represents a media query to be identified, the digital media data provided by a first remote device, accessing, using the one or more processor circuits, a first context parameter that corresponds to the media query to be identified, the first context parameter provided by the same first remote device, determining, using the one or more processor circuits, spectral features corresponding to the digital media data, and selecting, using the one or more processor circuits, a first classification model stored in a database, the first classification model being one of a plurality of different classification models stored in the database, the selecting based on the first context parameter. Example 1 can further include determining, using the one or more processor circuits, a media type probability index for the media query using the first classification model and the determined spectral features corresponding to the digital media data, wherein the determined media type probability index indicates a likelihood that the media query corresponds to at least one media characteristic of a plurality of different media characteristics. Example 1 can further include receiving, at the first remote device, one or both of the media type probability index and the at least one media characteristic.

Example 2 can include or use, or can optionally be combined with the subject matter of Example 1, to further include identifying, using the one or more processor circuits, a change in the digital media data or a change in the first context parameter and, in response, selecting a different second classification model from among the plurality of different classification models, and determining, using the one or more processor circuits, an updated media type probability index using the different second classification model.

Example 3 can include or use, or can optionally be combined with the subject matter of Examples 1 or 2, to further include wherein the selecting the first classification model from among a plurality of different classification models includes selecting one or more of the determined spectral features and using information about the selected one or more features with a first portion of a neural network, and wherein the determining the media type probability index includes using an output of the neural network.

Example 4 can include or use, or can optionally be combined with the subject matter of at least one of Examples 1-3, to further include wherein the determining the media type probability index includes using a neural network with the selected first classification model to provide an indication of a likelihood that the digital media data corresponds to a specified audio event or specified visual event, wherein the neural network is previously trained using a priori information about the specified audio event or the specified visual event.

Example 5 can include or use, or can optionally be combined with the subject matter of at least one of Examples 1-4, to further include wherein the accessing the first context parameter includes accessing a context parameter that indicates that the digital media data includes audio data received by a microphone of a mobile device, wherein the selecting the first classification model includes selecting a speech/music classification model for mobile devices, and wherein the determining the media type probability index includes using the selected speech/music classification model for mobile devices and using the determined spectral features corresponding to the digital media data that includes the audio data received by the microphone of the mobile device.

Example 6 can include or use, or can optionally be combined with the subject matter of at least one of Examples 1-5, to further include wherein the accessing the first context parameter includes accessing a context parameter that indicates that the digital media data includes audio data received from a television broadcast, wherein the selecting the first classification model includes selecting a speech/music classification model for television broadcast, and wherein the determining the audio type probability index includes using the selected speech/music classification model for television broadcast and using the determined spectral features corresponding to the digital media data that includes the audio data received from the television broadcast.

Example 7 can include or use, or can optionally be combined with the subject matter of at least one of Examples 1-6, to further include wherein the accessing the first context parameter includes accessing an indication of a source type of the digital media data, and wherein the source type includes one or more of a mobile device, a broadcast video or broadcast audio stream, a local signal source, or a microphone signal source.

Example 8 can include or use, or can optionally be combined with the subject matter of at least one of Examples 1-7, to further include accessing, using the one or more processor circuits, a second context parameter that corresponds to the media query to be identified, wherein the second context parameter is provided by the same first remote device or a different device, and determining, using the one or more processor circuits, search scope characteristics that are respectively associated with each of the first and second context parameters, and selecting, from the database and using the one or more processor circuits, the one of the first and second context parameters associated with a narrower search scope, wherein the selecting the first classification model includes using the selected one of the first and second context parameters associated with the narrower search scope.

Example 9 can include or use, or can optionally be combined with the subject matter of at least one of Examples 1-8, to further include accessing, using the one or more processor circuits, a second context parameter that corresponds to the media query to be identified, determining, using the one or more processor circuits, signal quality characteristics that are respectively associated with each of the first and second context parameters, and selecting, using the one or more processor circuits, one of the first and second context parameters based on the determined respective signal quality characteristics, wherein the selecting the first classification model includes using the selected one of the first and second context parameters.

Example 10 can include or use, or can optionally be combined with the subject matter of at least one of Examples 1-9, to further include wherein the accessing the first context parameter that corresponds to the media query includes accessing context information that temporally coincides with the media query to be identified.

Example 11 can include or use, or can optionally be combined with the subject matter of at least one of Examples 1-10, to further include wherein the accessing the first context parameter includes determining the first context parameter using a determined characteristic of a sampled portion of the digital media data itself.

Example 12 can include or use, or can optionally be combined with the subject matter of Example 11, to include or use wherein the determining the first context parameter using the media data itself includes determining whether the media data includes one or more of previously-recorded music, live music, speech, television audio, movie audio, game audio, or other audio.

Example 13 can include or use, or can optionally be combined with the subject matter of at least one of Examples 1-12, to further include wherein the accessing the first context parameter includes receiving context information from a sensor device associated with the first remote device, the sensor device including one or more of a GPS or location sensor, an accelerometer, a microphone, a clock or timer circuit, or a user input.

Example 14 can include or use, or can optionally be combined with the subject matter of at least one of Examples 1-13, to further include analyzing the determined spectral features corresponding to the digital media data to determine whether a threshold change has occurred in the media query since earlier digital media data was accessed, and if the threshold change has not occurred, then inhibiting the determining the media type probability index.

Example 15 can include or use, or can optionally be combined with the subject matter of at least one of Examples 1-14, to further include wherein the accessing the digital media data includes periodically or intermittently sampling audio data from a continuous query sound source, and wherein the determining the media type probability index includes determining an audio type probability index for each of the respective periodically or intermittently sampled audio data.

Example 16 can include or use, or can optionally be combined with the subject matter of at least one of Examples 1-15, to further include determining a search depth parameter, and wherein the determining the media type probability index includes using the search depth parameter to determine a processor circuit resource amount to expend in determining the media type probability index.

Example 17 can include or use, or can optionally be combined with the subject matter of at least one of Examples 1-16, to further include wherein the accessing the digital media data includes analyzing a signal quality of the media data and, if the signal quality is insufficient, then re-sampling the digital media data corresponding to a different portion of the media query.

Example 18 can include or use, or can optionally be combined with the subject matter of at least one of Examples 1-17, to further include wherein the selecting the first classification model includes selecting the model from among a plurality of classification models that are previously associated with a specified user.

Example 19 can include or use, or can optionally be combined with the subject matter of at least one of Examples 1-18, to further include wherein the determining the media type probability index associated with the media query includes using the spectral features as an input to a convolutional neural network that provides the media type probability index and/or the at least one media characteristic.

Example 20 can include or use subject matter (such as an apparatus, a method, a means for performing operations, or a machine readable memory including instructions that, when performed by the machine, can configure the machine to perform acts), such as can include or use a tangible, non-transitory computer-readable storage medium comprising instructions that, when executed by at least one processor of a machine, cause the machine to perform operations comprising: receiving, from a remote device, digital media data that represents a media query to be identified; receiving, from the remote device, a first context parameter that corresponds to the media query to be identified; selecting a first classification model from a database, the first classification model being one of a plurality of different classification models stored in the database, the selecting based on the received first context parameter; determining a media type probability index for the media query using a neural network to apply the selected first classification model; determining at least one media characteristic for the media query using the determined media type probability index; and providing, to the remote device, the at least one media characteristic for the media query.

Example 21 can include or use, or can optionally be combined with the subject matter of Example 20, to include wherein the operations further comprise: receiving, from the same or a different remote device, a subsequent second context parameter that corresponds to the same or different media query to be identified; selecting a second classification model from the database, the selecting based on the second context parameter; and determining an updated media type probability index for the same or different media query to be identified using the neural network to apply the selected second classification model.

Example 22 can include or use, or can optionally be combined with the subject matter of at least one of Examples 20 and 21, to further include wherein the operations further comprise: receiving an indication of a change in a status of the remote device, and in response to receiving the indication: accessing a subsequent second context parameter that corresponds to the same or different media query to be identified; selecting a second classification model from the database, the selecting based on the second context parameter; and determining an updated media type probability index for the same or different media query to be identified, using the neural network to apply the selected second classification model.

Example 23 can include or use, or can optionally be combined with the subject matter of Example 22, to include or use wherein the operations for receiving the indication of the change in status of the remote device include receiving sensed information about a change in an environment characteristic corresponding to the device.

Example 24 can include or use, or can optionally be combined with the subject matter of at least one of Examples 20-23, to further include wherein the operations further comprise determining a noise characteristic associated with the media query and, when the determined noise characteristic indicates a noise level associated with the media query that exceeds a specified threshold noise level, then inhibiting one or more of the operations for accessing the first context parameter, for selecting the first classification model from the database, or for determining the media type probability index.

Example 25 can include or use, or can optionally be combined with the subject matter of at least one of Examples 20-24, to further include wherein the operations further comprise: determining a spectral characteristic associated with the media query and, based on the determined spectral characteristic, selectively inhibiting one or more of the operations for accessing the first context parameter, for selecting the first classification model from the database, or for determining the media type probability index.

Example 26 can include or use subject matter (such as an apparatus, a method, a means for performing operations, or a machine readable memory including instructions that, when performed by the machine, can configure the machine to perform acts), such as can include or use a system comprising a mobile device that includes a first processor circuit, a first sensor configured to receive digital media data that represents a media query to be identified, and a second sensor configured to sense first context information about the mobile device, wherein the first processor circuit is configured to transmit the digital media data and the first context information to a remote media classifier. In Example 26, the system can further comprise a second processor circuit associated with the remote media classifier, the second processor circuit configured to receive the digital media data and the first context information from the mobile device, and the second processor circuit configured to execute instructions that cause the second processor circuit to perform operations comprising: selecting a first classification model from a database comprising a plurality of different classification models, the selecting based on the received digital media data and the first context information, determining a media characteristic for the media to be identified using the selected first classification model and the digital media data, and providing, to the mobile device, the determined media characteristic.

Example 27 can include or use, or can optionally be combined with the subject matter of Example 26, to include or use wherein the first processor circuit is configured to coordinate a series of data transmissions to the remote media classifier at specified intervals, and wherein the data transmissions include respective samples of digital media data sampled using the first sensor and corresponding samples of context information sensed using the second sensor, and wherein the second processor circuit is configured to execute instructions that cause the second processor circuit to perform operations further comprising: selecting a different second classification model from the database, the selecting based on a corresponding pair of the sampled digital media data and corresponding sampled context information; and determining the media characteristic using the selected different second classification model.

Example 28 can include or use, or can optionally be combined with the subject matter of at least one of Examples 26 and 27, to further include wherein the mobile device further comprises a third sensor configured to sense different second context information about the mobile device, and wherein one of the first and second processor circuits is configured to select one of the first and different second context information for use in selecting the first classification model from the database.

Example 29 can include or use, or can optionally be combined with the subject matter of at least one of Examples 26-28, to further include wherein the mobile device further comprises a spectral analysis circuit that is configured to identify a noise characteristic for one or both of the digital media data and the first context information, and wherein the first processor circuit is configured to transmit the digital media data and the first context information to the remote media classifier when the identified noise characteristic indicates a noise level that is less than a specified threshold noise level.

Example 30 can include or use, or can optionally be combined with the subject matter of at least one of Examples 26-29, to further include wherein the mobile device further comprises a spectral analysis circuit that is configured to identify a frequency characteristic of the digital media data, and wherein the first processor circuit is configured to transmit the digital media data and the first context information to the remote media classifier when the identified frequency characteristic satisfies a specified frequency characteristic condition.

Example 31 can include or use, or can optionally be combined with the subject matter of at least one of Examples 26-30, to further include wherein the second sensor includes a microphone configured to sense an ambient noise characteristic associated with the digital media data, and wherein the second processor circuit is configured to perform the selecting the first classification model from the database using the sensed ambient noise characteristic associated with the digital media data.

Example 32 can include or use, or can optionally be combined with the subject matter of at least one of Examples 26-31, to further include wherein the second sensor includes a location sensor that is configured to sense information about a location of the mobile device, and wherein the second processor circuit is configured to perform the selecting the first classification model from the database using the sensed information about the location of the mobile device.

This detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. The present inventors contemplate examples using any combination or permutation of those elements shown or described (or one or more aspects thereof), either with respect to a particular example (or one or more aspects thereof), or with respect to other examples (or one or more aspects thereof) shown or described herein.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including"

and "in which" are used as the plain-English equivalents of the respective terms "comprising" and "wherein."

Although various general and specific embodiments are described herein, it will be evident that various modifications and changes can be made to these embodiments without departing from the broader spirit and scope of the present disclosure. Accordingly, the specification and drawings are to be regarded in an illustrative rather than a restrictive sense. The accompanying drawings that form a part of this application show, by way of illustration, and not of limitation, specific embodiments in which the subject matter can be practiced. The embodiments illustrated are described in sufficient detail to enable those skilled in the art to practice the teachings disclosed herein. Other embodiments can be used or derived there from, such that structural and logical substitutions and changes can be made without departing from the scope of this disclosure. This Detailed Description, therefore, is not to be taken in a limiting sense, and the scope of various embodiments is defined only by the appended claims, along with the full range of equivalents to which such claims are entitled. Specific embodiments or examples are illustrated and described herein, however, it should be appreciated that any arrangement calculated to achieve the same purpose can be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A method for classifying media, the method comprising:
   accessing, using one or more processor circuits, first digital media data that represents a first media query to be identified, the first digital media data provided by a mobile device;
   accessing, using the one or more processor circuits, a first context parameter associated with the mobile device, the first context parameter corresponding to the first media query to be identified, the first context parameter provided by the mobile device;
   determining whether a specified duration has elapsed since a prior media query was classified;
   in response to determining that a specified duration has elapsed since the prior media query was classified, determining whether the first media query has a sufficient minimum signal quality;
   in response to determining that the first media query has a sufficient minimum signal quality, determining whether the first media query has changed by more than some specified first threshold amount with respect to the prior media query;
   in response to determining that the first media query has changed by more than the specified first threshold amount, determining whether the first context parameter associated with the first media query has changed by more than a specified second threshold amount;
   in response to determining that the first context parameter has changed by more than the specified second threshold amount, determining whether the first context parameter meets some specified minimum signal quality;
   in response to determining that the first context parameter meets some specified minimum signal quality, selecting, using the one or more processor circuits, a first classification model stored in a database including a plurality of different classification models, the selecting based on the first digital media data and the first context parameter;
   determining, using the one or more processor circuits, a media characteristic for the first media query using the first classification model, wherein the media characteristic includes a media type probability index indicative of a likelihood that the first media query corresponds to the media characteristic;
   determining, using the one or more processor circuits, the first media query was successfully classified based on the media type probability index;
   in response to determining that the first media query was successfully classified, updating, using the one or more processor circuits, the specified second threshold amount based on the change in the first context parameter associated with the first media query; and
   transmitting, to the mobile device, at least the media characteristic.

2. The method of claim 1, wherein:
   the selecting of the first classification model from among the plurality of different classification models includes selecting one or more spectral features corresponding to the first digital media data and applying information about the one or more spectral features to a first portion of a neural network;
   the media characteristic includes at least one media characteristic of a plurality of media characteristics; and
   an output of the neural network includes the media type probability index.

3. The method of claim 1, wherein:
   the accessing of the first context parameter includes accessing a context parameter that indicates that the first digital media data includes audio data received by a microphone of a mobile device;
   the selecting of the first classification model includes selecting a speech/music classification model for mobile devices; and
   the determining of the media characteristic includes utilizing the speech/music classification model for the mobile devices and utilizing spectral features corresponding to the first digital media data that includes the audio data received by the microphone of the mobile device.

4. The method of claim 1, wherein:
   the accessing of the first context parameter includes accessing an indication of a source type of the first digital media data; and
   the source type includes one or more of a mobile device, a broadcast video or broadcast audio stream, a local signal source, or a microphone signal source.

5. The method of claim 1, further including:
   accessing, using the one or more processor circuits, a second context parameter that corresponds to the first media query to be identified, the second context parameter provided by the mobile device or a different device;
   determining, using the one or more processor circuits, search scope characteristics that are respectively associated with each of the first context parameter and the second context parameter; and
   selecting, from the database and using the one or more processor circuits, the one of the first context parameter and the second context parameter associated with a narrower search scope; and wherein the selecting of the first classification model includes using the one of the first context parameter and the second context parameter associated with the narrower search scope.

6. The method of claim 1, further including:
   determining a search depth parameter; and
   wherein the determining of the media characteristic includes using the search depth parameter to determine a processor circuit resource amount to expend in determining the media characteristic.

7. The method of claim 1, wherein the selecting of the first classification model includes selecting the first classification model from among a plurality of classification models that are previously associated with a specified user.

8. A tangible, non-transitory computer readable medium comprising instructions that, when executed, cause at least one processor to perform a set of operations comprising:
   accessing, using one or more processor circuits, first digital media data that represents a first media query to be identified, the first digital media data provided by a mobile device;
   accessing, using the one or more processor circuits, a first context parameter associated with the mobile device, the first context parameter corresponding to the first media query to be identified, the first context parameter provided by the mobile device;
   determining whether a specified duration has elapsed since a prior media query was classified;
   in response to determining that a specified duration has elapsed since the prior media query was classified, determining whether the first media query has a sufficient minimum signal quality;
   in response to determining that the first media query has a sufficient minimum signal quality, determining whether the first media query has changed by more than some specified first threshold amount with respect to the prior media query;
   in response to determining that the first media query has changed by more than the specified first threshold amount, determining whether the first context parameter associated with the first media query has changed by more than a specified second threshold amount;
   in response to determining that the first context parameter has changed by more than the specified second threshold amount, determining whether the first context parameter meets some specified minimum signal quality;
   in response to determining that the first context parameter meets some specified minimum signal quality, selecting, using the one or more processor circuits, a first classification model stored in a database including a plurality of different classification models, the selecting based on the first digital media data and the first context parameter;
   determining, using the one or more processor circuits, a media characteristic for the first media query using the first classification model, wherein the media characteristic includes a media type probability index indicative of a likelihood that the first media query corresponds to the media characteristic;
   determining, using the one or more processor circuits, the first media query was successfully classified based on the media type probability index;
   in response to determining that the first media query was successfully classified, updating, using the one or more processor circuits, the specified second threshold amount based on the change in the first context parameter associated with the first media query; and
   transmitting, to the mobile device, at least the media characteristic.

9. The tangible, non-transitory computer readable medium of claim 8, wherein:
   the selecting of the first classification model from among the plurality of different classification models includes selecting one or more spectral features corresponding to the first digital media data and applying information about the one or more spectral features to a first portion of a neural network;
   the media characteristic includes at least one media characteristic of a plurality of media characteristics; and
   an output of the neural network includes the media type probability index.

10. The tangible, non-transitory computer readable medium of claim 8, wherein:
    the accessing of the first context parameter includes accessing a context parameter that indicates that the first digital media data includes audio data received by a microphone of a mobile device;
    the selecting of the first classification model includes selecting a speech/music classification model for mobile devices; and
    the determining of the media characteristic includes utilizing the speech/music classification model for the mobile devices and utilizing spectral features corresponding to the first digital media data that includes the audio data received by the microphone of the mobile device.

11. The tangible, non-transitory computer readable medium of claim 8, wherein:
    the accessing of the first context parameter includes accessing an indication of a source type of the first digital media data; and
    the source type includes one or more of a mobile device, a broadcast video or broadcast audio stream, a local signal source, or a microphone signal source.

12. The tangible, non-transitory computer readable medium of claim 8, wherein the set of operations further comprises:
    accessing, using the one or more processor circuits, a second context parameter that corresponds to the first media query to be identified, the second context parameter provided by the mobile device or a different device;
    determining, using the one or more processor circuits, search scope characteristics that are respectively associated with each of the first context parameter and the second context parameter; and
    selecting, from the database and using the one or more processor circuits, the one of the first context parameter and the second context parameter associated with a narrower search scope; and
    wherein the selecting of the first classification model includes using the one of the first context parameter and the second context parameter associated with the narrower search scope.

13. The tangible, non-transitory computer readable medium of claim 8, wherein the set of operations further comprises:
    determining a search depth parameter; and
    wherein the determining of the media characteristic includes using the search depth parameter to determine a processor circuit resource amount to expend in determining the media characteristic.

14. The tangible, non-transitory computer readable medium of claim 8, wherein the selecting of the first classification model includes selecting the first classification model from among a plurality of classification models that are previously associated with a specified user.

15. A computing device comprising:
at least one processor; and
tangible, non-transitory computer readable medium comprising instructions that, when executed, cause the at least one processor to perform a set of operations comprising:
accessing, using one or more processor circuits, first digital media data that represents a first media query to be identified, the first digital media data provided by a mobile device;
accessing, using the one or more processor circuits, a first context parameter associated with the mobile device, the first context parameter corresponding to the first media query to be identified, the first context parameter provided by the mobile device;
determining whether a specified duration has elapsed since a prior media query was classified;
in response to determining that a specified duration has elapsed since the prior media query was classified, determining whether the first media query has a sufficient minimum signal quality;
in response to determining that the first media query has a sufficient minimum signal quality, determining whether the first media query has changed by more than some specified first threshold amount with respect to the prior media query;
in response to determining that the first media query has changed by more than the specified first threshold amount, determining whether the first context parameter associated with the first media query has changed by more than a specified second threshold amount;
in response to determining that the first context parameter has changed by more than the specified second threshold amount, determining whether the first context parameter meets some specified minimum signal quality;
in response to determining that the first context parameter meets some specified minimum signal quality, selecting, using the one or more processor circuits, a first classification model stored in a database including a plurality of different classification models, the selecting based on the first digital media data and the first context parameter;
determining, using the one or more processor circuits, a media characteristic for the first media query using the first classification model, wherein the media characteristic includes a media type probability index indicative of a likelihood that the first media query corresponds to the media characteristic;
determining, using the one or more processor circuits, the first media query was successfully classified based on the media type probability index;
in response to determining that the first media query was successfully classified, updating, using the one or more processor circuits, the specified second threshold amount based on the change in the first context parameter associated with the first media query; and
transmitting, to the mobile device, at least the media characteristic.

16. The computing device of claim 15, wherein:
the selecting of the first classification model from among the plurality of different classification models includes selecting one or more spectral features corresponding to the first digital media data and applying information about the one or more spectral features to a first portion of a neural network;
the media characteristic includes at least one media characteristic of a plurality of media characteristics; and
an output of the neural network includes the media type probability index.

17. The computing device of claim 15, wherein:
the accessing of the first context parameter includes accessing a context parameter that indicates that the first digital media data includes audio data received by a microphone of a mobile device;
the selecting of the first classification model includes selecting a speech/music classification model for mobile devices; and
the determining of the media characteristic includes utilizing the speech/music classification model for the mobile devices and utilizing spectral features corresponding to the first digital media data that includes the audio data received by the microphone of the mobile device.

18. The computing device of claim 15, wherein:
the accessing of the first context parameter includes accessing an indication of a source type of the first digital media data; and
the source type includes one or more of a mobile device, a broadcast video or broadcast audio stream, a local signal source, or a microphone signal source.

19. The computing device of claim 15, wherein the set of operations further comprises:
accessing, using the one or more processor circuits, a second context parameter that corresponds to the first media query to be identified, the second context parameter provided by the mobile device or a different device;
determining, using the one or more processor circuits, search scope characteristics that are respectively associated with each of the first context parameter and the second context parameter; and
selecting, from the database and using the one or more processor circuits, the one of the first context parameter and the second context parameter associated with a narrower search scope; and
wherein the selecting of the first classification model includes using the one of the first context parameter and the second context parameter associated with the narrower search scope.

20. The computing device of claim 15, wherein the set of operations further comprises:
determining a search depth parameter; and
wherein the determining of the media characteristic includes using the search depth parameter to determine a processor circuit resource amount to expend in determining the media characteristic.

* * * * *